(12) United States Patent
Miyagawa

(10) Patent No.: US 7,938,447 B2
(45) Date of Patent: May 10, 2011

(54) SEAT BELT APPARATUS

(75) Inventor: Toshihito Miyagawa, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 223 days.

(21) Appl. No.: 12/263,419

(22) Filed: Oct. 31, 2008

(65) Prior Publication Data

US 2009/0115180 A1    May 7, 2009

(30) Foreign Application Priority Data

Nov. 5, 2007  (JP) ................................. 2007-287557
Aug. 1, 2008  (JP) ................................. 2008-199630

(51) Int. Cl.
 *B60R 22/00* (2006.01)
(52) U.S. Cl. ...................... 280/808; 280/801.1; 297/484
(58) Field of Classification Search .................. 280/808, 280/801.1; 297/468, 484, 483, 486
See application file for complete search history.

(56) References Cited

U.S. PATENT DOCUMENTS

| 6,293,588 | B1 * | 9/2001 | Clune | 280/808 |
| 6,309,024 | B1 * | 10/2001 | Busch | 297/484 |
| 6,375,270 | B1 * | 4/2002 | Sullivan et al. | 297/484 |
| 6,786,510 | B2 * | 9/2004 | Roychoudhury et al. | 280/802 |
| 6,837,547 | B2 * | 1/2005 | Delventhal et al. | 297/484 |
| 7,364,199 | B2 * | 4/2008 | Elizondo et al. | 280/801.1 |
| 7,625,048 | B2 * | 12/2009 | Rouhana et al. | 297/484 |
| 7,775,557 | B2 * | 8/2010 | Bostrom et al. | 280/801.1 |
| 2002/0089163 | A1 * | 7/2002 | Bedewi et al. | 280/801.1 |
| 2002/0089164 | A1 * | 7/2002 | Rouhana et al. | 280/801.1 |
| 2003/0034686 | A1 | 2/2003 | Soderstrom et al. | |
| 2004/0012242 | A1 * | 1/2004 | White | 297/484 |
| 2005/0073187 | A1 * | 4/2005 | Frank et al. | 297/484 |

FOREIGN PATENT DOCUMENTS

| GB | 1 336 046 | 9/1974 |
| GB | 1 403 777 | 8/1975 |
| JP | 10-194081 A | 7/1998 |
| JP | 2000-16234 A | 1/2000 |
| JP | 2004-9967 A | 1/2004 |
| WO | 02/22406 A1 | 3/2002 |

OTHER PUBLICATIONS

European Search Report dated Feb. 17, 2009 from corresponding European Patent Application No. EP 08 01 9277.

* cited by examiner

*Primary Examiner* — Eric Culbreth
*Assistant Examiner* — Drew Brown
(74) *Attorney, Agent, or Firm* — Roberts Mlotkowski Safran & Cole P.C.

(57) ABSTRACT

A seat belt apparatus simplifying an operation of mounting tongues to left and right respective buckles is provided. In the seat belt apparatus, a second tongue is held by a second tongue containing portion provided at a first buckle, and a first tongue is held by a first tongue containing portion provided at a second buckle. When mounting a first and second shoulder belt, and a first and second lap belt, when both of the first buckle and the second buckle are pulled to a front side of an occupant and an inserting hole of the first buckle and an inserting piece of the first tongue are opposed to each other, an inserting piece of the second tongue and an inserting hole of the second buckle are opposed to each other. When the inserting piece of the first tongue is inserted to the inserting hole of the first buckle, the inserting piece of the second tongue is inserted to the inserting hole of the second buckle.

8 Claims, 24 Drawing Sheets

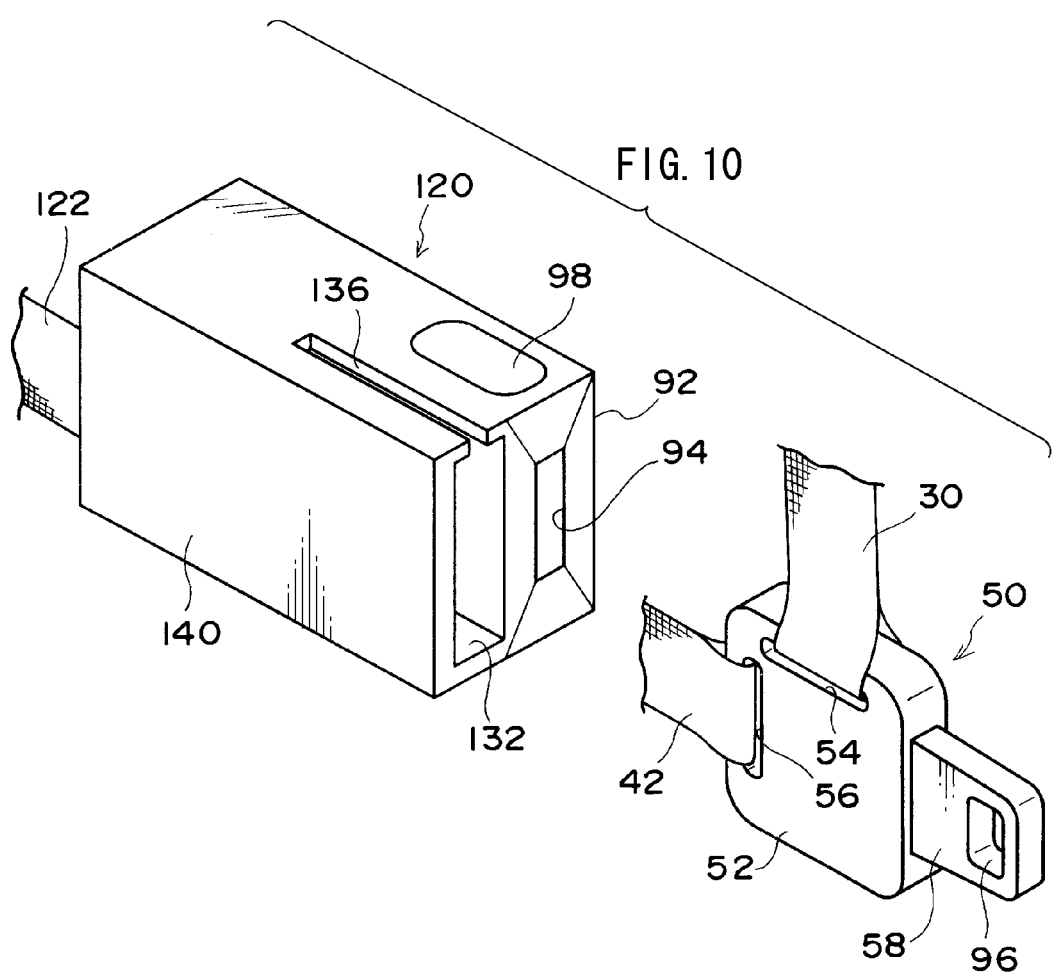

SEAT BELT APPARATUS

CROSS-REFERENCE TO RELATED APPLICATIONS

This application claims priority under 35 USC 119 from Japanese Patent Applications Nos. 2007-287557 and 2008-199630, the disclosures of which is incorporated by reference herein.

BACKGROUND

1. Technical Field

The present invention relates to a seat belt apparatus for restraining the body of an occupant seated on a seat of a vehicle.

2. Related Art

JP-A No. 2004-9967 discloses a constitution of providing so-to-speak three points type seat belt apparatus at both of a left and a right side of a seat. Therefore, at the right side seat belt apparatus (first seat belt apparatus), a shoulder belt portion of a webbing belt (first seat belt) restrains the right shoulder portion over to the left waist portion of an occupant via the right chest portion, and at the left side seat belt apparatus (second seat belt apparatus), a shoulder belt portion of a webbing belt (second seat belt) restrains the left shoulder portion over to the right waist portion of the occupant via the left chest portion.

Meanwhile, according to the constitution of providing the three points type seat belt apparatus on both left and right sides in this way, a buckle is provided on the left side of the seat for the webbing belt of the right side seat belt apparatus, and a buckle is provided on the right side of the seat for the webbing belt of the left side seat belt apparatus. Therefore, unless tongues are mounted to respectively the two buckles, a state of mounting the two webbing belts is not brought about, and a mounting operation is complicated.

SUMMARY

According to the invention described in claim 1, there is provided a seat belt apparatus including a first shoulder belt that restrains an area from a right shoulder portion to a right chest portion of an occupant seated on a seat of a vehicle; a first lap belt, one end of which is fixed at a right rear portion of a seat cushion of the seat or in a vicinity thereof; a first tongue connected to both of the first shoulder belt and the first lap belt; a second shoulder belt that restrains an area from a left shoulder portion to a left chest portion of the occupant seated on the seat; a second lap belt that restrains a waist portion of the occupant, one end thereof being fixed at a left rear portion of the seat cushion or in a vicinity thereof; a second tongue connected to both of the second shoulder belt and the second lap belt; a first buckle provided at the left rear portion of the seat cushion or in a vicinity thereof, to which the first tongue may be mounted such that the first shoulder belt extends from the right shoulder portion of the occupant to the right chest portion of the occupant, and the first lap belt extends around the waist portion of the occupant; a second buckle provided at the right rear portion of the seat cushion or in a vicinity thereof, to which the second tongue may be mounted such that the second shoulder belt extends from the left shoulder portion of the occupant to the left chest portion of the occupant, and the second lap belt extends around the waist portion of the occupant; a first tongue holding portion provided at the second buckle, which, when the second tongue is mounted to the second buckle, holds the first tongue at a position where the first tongue may be mounted to the first buckle, and, when the first tongue is mounted to the first buckle, may release the first tongue by separating the second buckle from the first buckle; and a second tongue holding portion provided at the first buckle, which, when the first tongue is mounted to the first buckle, holds the second tongue at a position where the second tongue may be mounted to the second buckle, and, when the second tongue is mounted to the second buckle, may release the second tongue by separating the first buckle from the second buckle; wherein at least one buckle of the first buckle or the second buckle is movable to a tongue mounting position where the first tongue held by the first tongue holding portion may be mounted to the first buckle, and the second tongue held by the second tongue holding portion may be mounted to the second buckle.

According to the seat belt apparatus of the invention described in claim 1, when the first tongue is mounted to the first buckle provided at the left rear portion of the seat cushion or the vicinity and the first tongue is held by the first buckle, the first shoulder belt connected to the first tongue extends around the vicinities of the right chest portion from the right shoulder portion of the body of the occupant, further, the first lap belt connected to the first tongue extends around the waist portion of the occupant.

Further, when the second tongue is mounted to the second buckle provided at the right rear portion of the seat cushion or the vicinity and the second tongue is held by the second buckle, the second shoulder belt connected to the second tongue extends around the vicinities of the left chest portion from the left shoulder portion of the body of the occupant, further, the second lap belt connected to the second tongue extends around the waist portion of the occupant.

In this way, by hanging the first, the second shoulder belts and the first, the second lap belts around the body of the occupant, the first shoulder belt and the second shoulder belt are intersected in an X-like shape on front sides of the shoulder portion and the chest portion of the occupant, the two shoulder portions and the two chest portions are restrained, and therefore, the body of the occupant can be restrained more tightly than the three points type Meanwhile, according to the seat belt apparatus of the invention, the first tongue mounted to the first buckle is held by the first tongue holding portion provided at the second buckle, and the second tongue mounted to the second buckle is held by the second tongue portion provided at the first buckle.

Here, when the first tongue held by the first tongue holding portion is mounted to the first buckle provided with the second tongue holding portion, the second tongue in a state of being held by the second tongue holding portion is mounted to the second buckle provided with the first tongue holding portion. When the first tongue is mounted to the first buckle provided with the second tongue holding portion, the second tongue in a state of being held by the second tongue holding portion is mounted to the second buckle provided with the first tongue holding portion.

Further, at least one buckle of the first buckle provided with the second tongue holding portion and the second buckle provided with the first tongue holding portion is made to be movable to the tongue mounting position capable of mounting the first tongue to the first buckle and capable of mounting the second tongue to the second buckle. Therefore, when at least either one buckle of the first buckle and the second buckle (that is, buckle of the first buckle and the second buckle movable to the tongue mounting position) is moved and the first tongue is mounted to the first buckle provided with the second tongue holding portion, the second tongue in a state of being held by the second tongue holding portion is mounted to the second buckle provided with the first tongue holding portion.

That is, the seat belt apparatus according to the invention is constructed by mounting the first, the second shoulder belts and the first, the second lap belts to the body of the occupant by mounting the first tongue to the first buckle and mounting the second tongue to the second buckle. When either one tongue of the first tongue and the second tongue is mounted to either one buckle of the first buckle and the second buckle, any other tongue is also mounted to any other buckle, and therefore, an operation of mounting the tongue to the buckle is inconsiderable and simple.

In a state of holding the first tongue by the first buckle and holding the second tongue by the second buckle in this way, when the buckle of the first buckle and the second buckle moved to the tongue mounting position is returned to an original position, the first buckle and the second buckle are separated from each other, and therefore, the first tongue holding portion and the second tongue holding portion are separated from each other. Thereby, the fist tongue holding portion provided at the second buckle releases the first tongue mounted to the first buckle from being held and the second tongue holding portion provided at the first buckle releases the second tongue mounted to the second buckle from being held.

In a state of releasing the first, the second tongues from being held by the first, the second tongue holding portions, when the buckle moved to the mounting position is returned to the original position, the first, the second shoulder belts and the first, the second lap belts are brought into a state of being mounted to the body of the occupant.

In this way, according to the seat belt apparatus of the invention, the mounting operation is inconsiderable and simple despite that the body of the occupant can be restrained more tightly than the three points type seat belt apparatus of the related art.

According to the seat belt apparatus of the invention described in claim 2, in the invention described in claim 1, both of the first buckle and the second buckle are movable to the tongue mounting position.

According to the seat belt apparatus of the invention described in claim 2, both of the first buckle and the second buckle are made to be movable to the tongue mounting position capable of mounting the first tongue held by the first tongue holding portion to the first buckle and capable of mounting the second tongue held by the second tongue holding portion to the second buckle. That is, according to the seat belt apparatus of the invention, by making the first buckle and the second buckle respectively move to be proximate to each other, the first tongue held by the first tongue holding portion is mounted to the first buckle and the second tongue held by the second tongue holding portion is mounted to the second buckle.

In this way, both of the first buckle and the second buckle are moved on mounting the first tongue to the first buckle and mounting the second tongue to the second buckle, and therefore, individual distances of moving the first buckle and the second buckle can be shortened. Further, for example, the first tongue can be mounted to the first buckle and the second tongue can be mounted to the second buckle at the front side of the occupant seated on the seat, particularly, at a center side in a width direction of the seat and the mounting operation is further facilitated.

According to the seat belt apparatus of the invention described in claim 3, in the invention described in claim 1, only one of the first buckle and the second buckle is movable to the tongue mounting position.

According to the seat belt apparatus of the invention described in claim 3, only either one of the first buckle and the second buckle is made to be movable to the tongue mounting position capable of mounting the first tongue held by the first tongue holding portion to the first buckle and capable of mounting the second tongue held by the second tongue holding portion to the second buckle. That is, according to the seat belt apparatus of the invention, by moving either one buckle of the first buckle and the second buckle to be proximate to other buckle, the first tongue held by the first tongue holding portion is mounted to the first buckle and the second tongue held by the second tongue holding portion is mounted to the second buckle.

In this way, according to the seat belt apparatus of the invention, only either one of the first buckle and the second buckle is made to be movable to the position mounting the first, the second tongues to the first, the second buckles, and therefore, any other of the first buckle and the second buckle can be fixed to the seat or the like, and therefore, the structure is simplified. Further, the first buckle is provided with the second tongue holding portion, the second buckle is provided with the first tongue holding portion, and therefore, also the tongue holding portion in correspondence with any other of the first buckle and the second buckle can also be fixed to the seat or the like, and therefore, the structure is further simplified in the meaning.

According to the seat belt apparatus of the invention described in claim 4, the invention described in claim 1 further includes an urging portion that urges the buckle movable to the tongue mounting portion towards a position of the buckle before the buckle is moved.

According to the seat belt apparatus of the invention described in claim 4, when at least either one buckle of the first buckle and the second buckle is moved to the tongue mounting position capable of mounting the first tongue held by the first tongue holding portion to the first buckle and capable of mounting the second tongue held by the second tongue holding portion to the second buckle, the either one buckle is urged to the position before being moved by the urging portion. Therefore, when the first tongue is finished to be mounted to the first buckle and the second tongue is finished to be mounted to the second buckle, the buckle moved to the tongue mounting position returns to the original position without carrying out a special operation. Therefore, the mounting operation is further facilitated.

The seat belt apparatus of the invention described in claim 5 further includes a hollow first arm which is attached to a right side face of the seat and which extends outwards therefrom, and into which the first lap belt is inserted, and a hollow second arm which is attached to a left side face of the seat and which extends outwards therefrom, and into which the second lap belt is inserted.

According to the seat belt apparatus of the invention described in claim 6, the first arm and the second buckle, as well as the second arm and the first buckle are connected in an insertion direction by respective expandable and contractible cylinder members.

According to the seat belt apparatus of the invention described in claim 7, one of the first arm and the second buckle, or the second arm and the first buckle, are integrally formed.

The seat belt apparatus of the invention described in claim 8 further includes a motor that exerts a drive force that moves at least one of the first buckle or the second buckle, an extrusion belt comprising a base end side in a longitudinal direction which is wound around a reel, the extrusion belt being connected to at least one of the first buckle or the second buckle, and a gear portion that transmits the drive force of the motor to the extrusion belt.

BRIEF DESCRIPTION OF THE DRAWINGS

Exemplary Embodiments of the present invention will be described in detail based on the following figures, wherein:

FIG. 10 is a perspective view showing a second buckle, a first tongue, and a first tongue holding portion;

DETAILED DESCRIPTION

Constitution of First Embodiment

Figure 1:
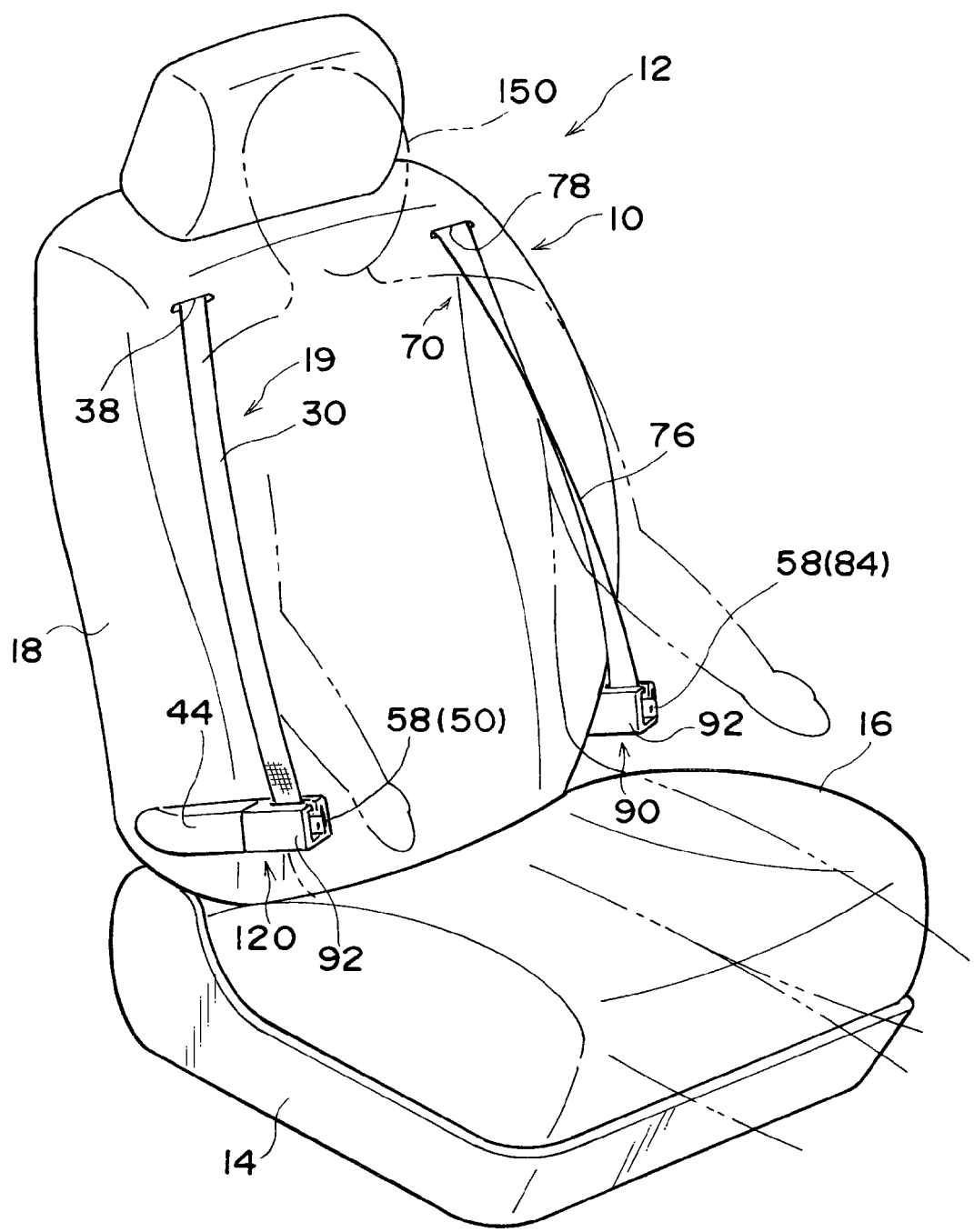
FIG. 1 is a perspective view of a seat mounted with a seat belt apparatus according to a first embodiment of the invention.

FIG. 1 shows a seat 12 for a vehicle mounted with a seat belt apparatus 10 according to a first embodiment of the invention by a perspective view. As shown by the drawing, the seat 12 includes a seat base 14. A seat cushion 16 constituting a seat portion of the seat 12 is attached to the seat base 14 in a mounted state above the seat base 14. Further, a seat back 18 constituting a shoulder rest of the seat 12 is attached to a rear end side of the seat base 14.

Figure 6:
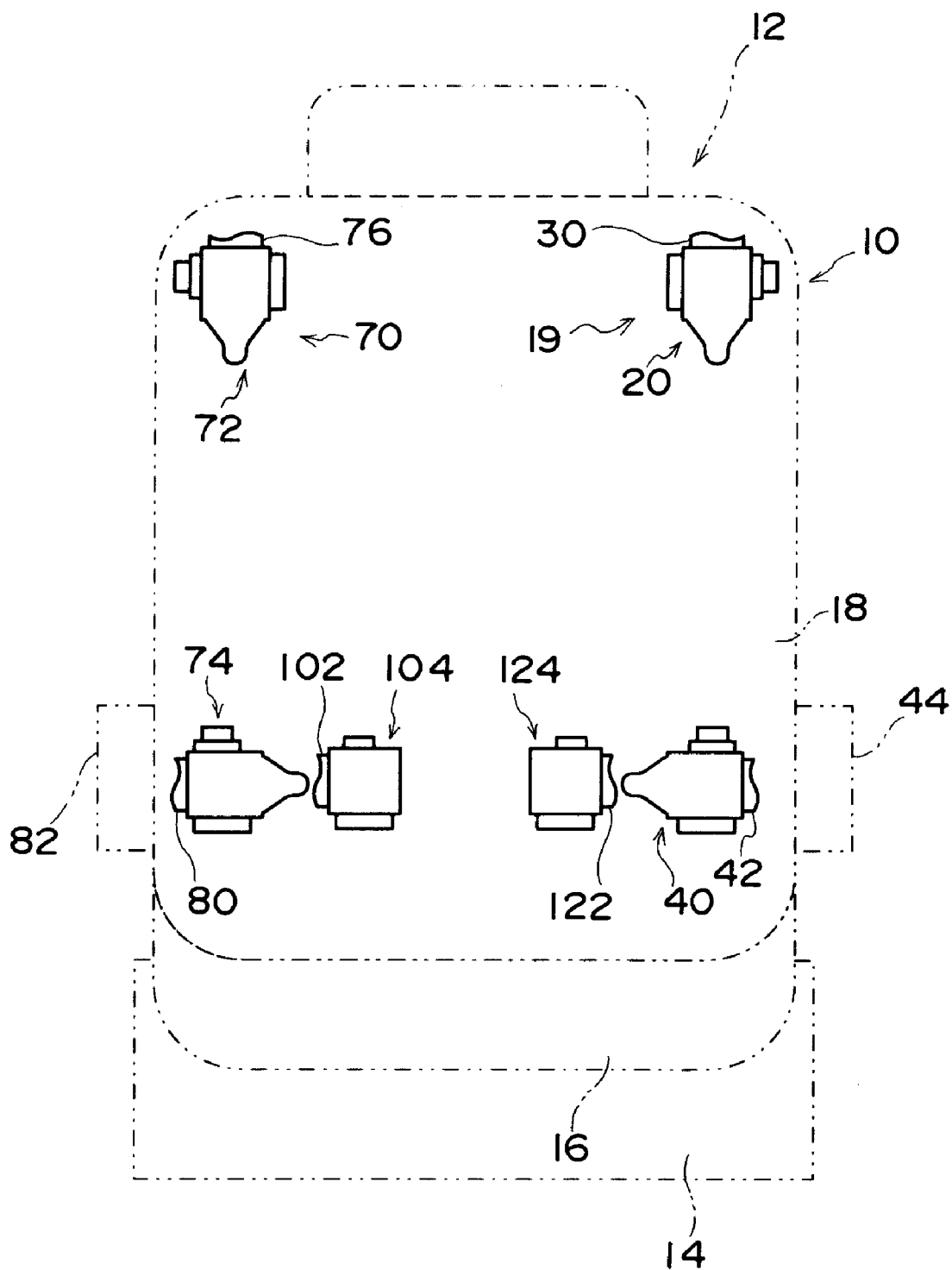
FIG. 6 is a rear view of a seat showing an essential portion of a constitution of seat belt apparatus at inside of a seat back.
Figure 7:
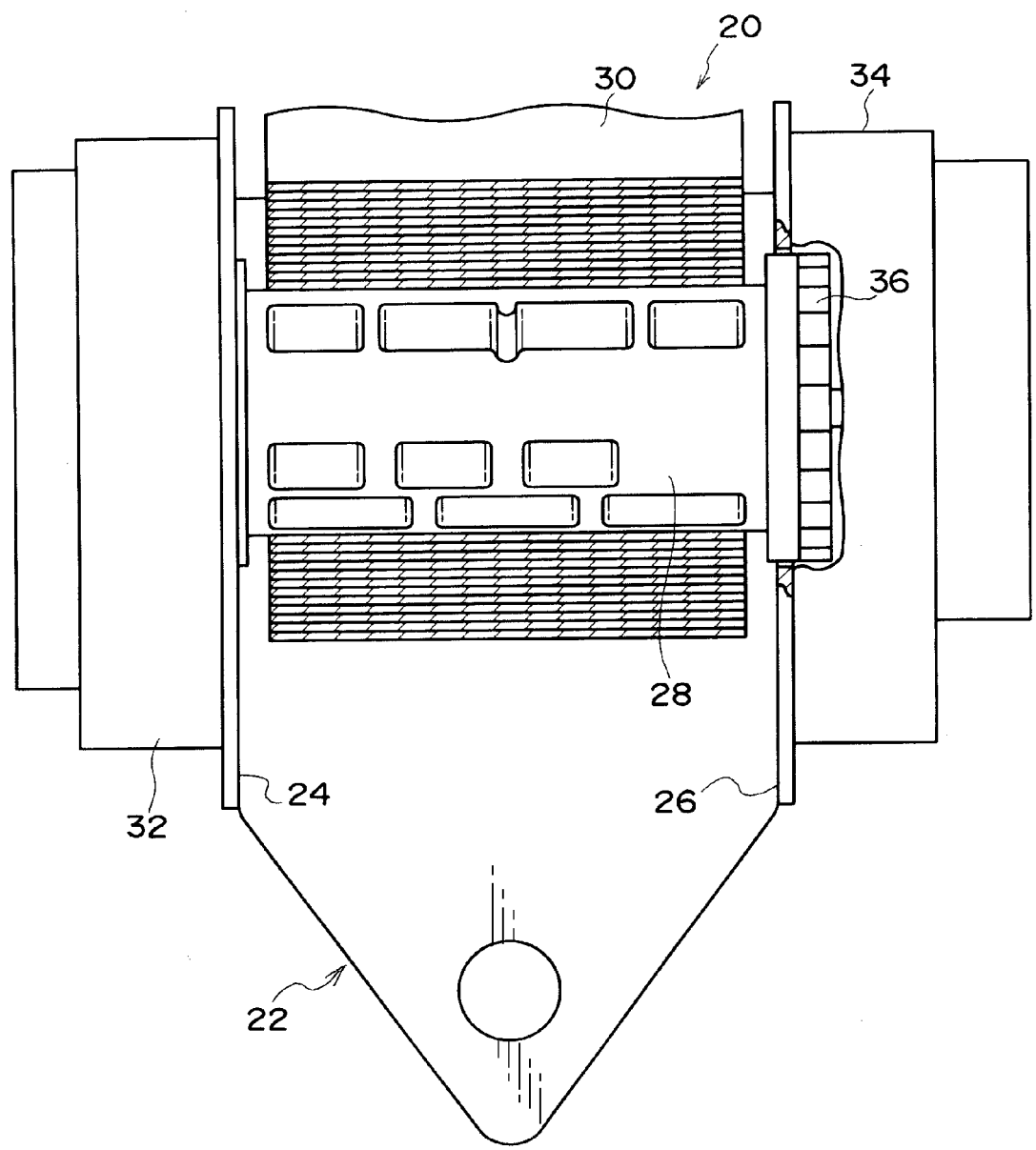
FIG. 7 is a front view showing an outline of a constitution of a first shoulder retractor.

As shown in FIG. 6, an upper end side of the seat back 18 on a right side in a left and right direction of the seat 12 is provided with a first shoulder retractor 20 constituting a first apparatus main body 19 at inside of the seat back 18. As shown in FIG. 7, the first shoulder retractor 20 includes a frame member constituting a frame of the seat back 18, and a frame 22 directly or indirectly fixed to a reinforcement member attached to the frame member for reinforcing the frame member.

The frame 22 includes a pair of leg plates 24, 26 opposed to each other in a left and right direction of the seat 12. A spool 28 is provided between the leg plate 24 and the leg plate 26 rotatably around an axis constituting an axial direction by the left and right direction of the seat 12. A base end portion in a longitudinal direction of a first shoulder belt 30 in a shape of a long strip is held by the spool 28. The spool 28 reels the first shoulder belt 30 from the base end side in the longitudinal direction to contain by being rotated in a reeling direction constituting one direction around an axis of its own.

The leg plate 24 of the frame 22 is attached with a spring case 32. A spiral spring is contained at inside of the spring case 32. The spiral spring is held directly or indirectly at one end of the spool 28 penetrated through the leg plate 24 and other end portion thereof is held at the spring case 32. When the spool 28 is rotated in an extracting direction reverse to the reeling direction, the spiral spring at inside of the spring case 32 is wound to fasten to urge the spool 28 in the reeling direction.

In contrast thereto, at the leg plate 26 of the frame 22 is attached a housing 34. Respective parts constituting a lock mechanism that operates by detecting acceleration when a vehicle decelerates rapidly and detecting rapid rotation in the extracting direction of the spool 28, are attached inside the housing 34. The parts constituting the lock mechanism include a lock pawl movable in directions of contact and separation from a latchet gear 36, which is coaxially and integrally connected to the spool 28, and when the lock mechanism is operated and the lock pawl engages the ratchet gear 36, the rotation in the extracting direction of the ratchet gear 36 is restricted.

As shown in FIG. 1, the first shoulder belt 30 of the first shoulder retractor 20 is extended to a front side of the seat back 18 by passing a slit hole 38 formed at a vicinity of an upper and right end portion of the seat back 18.

On the other hand, as shown in FIG. 6, a first lap retractor 40 constituting the first apparatus main body 19 is provided at a lower end side of the seat back 18 on the right side in the left and right direction of the seat 12 at inside of the seat back 18. The first lap retractor 40 and the first shoulder retractor 20 are basically provided with the same constitution except that whereas the direction of making the leg plate 24 and the leg plate 26 opposed to each other in the first shoulder retractor 20 is the left and right direction of the seat 12, the direction of making the leg plate 24 and the leg plate 26 opposed to each other in the first lap retractor 40 is an up and down direction of the seat 12, and therefore, a detailed explanation of the constitution of the first lap retractor 40 will be omitted.

A first lap belt 42 of the first lap retractor 40 in correspondence with the first shoulder belt 30 of the first shoulder retractor 20 is extended from a right side face of the seat back 18 to outside of the seat back 18 and is brought to a hollow arm 44 attached to the right side face of the seat back 18.

In correspondence with two front end portions of the first shoulder belt 30 and the first lap belt 42, the first apparatus main body 19 includes a first tongue 50 shown in FIG. 10. The first tongue 50 includes a tongue main body 52 in a shape of a rectangular plate. The tongue main body 52 is formed with a slit hole 54 penetrating in a thickness direction of the tongue main body 52. A front end side of the first shoulder belt 30 passes through the slit hole 54. The first shoulder belt 30 is folded back at a portion thereof that has passed through the slit hole 54, and a base end side and a front end side of the first shoulder belt 30 are sewn, via the folded back portion, at the base end side of the first shoulder belt 30 relative to the tongue main body 52. Thereby, the first shoulder belt 30 is connected to the first tongue 50.

Further, the tongue main body 52 is formed with a slit hole 56 penetrating in the thickness direction of the tongue main body 52. A longitudinal direction of the slit hole 56 intersects with a longitudinal direction of the slit hole 54. A front end side of the first lap belt 42 passes through the slit hole 56. The first lap belt 42 is folded back at a portion thereof that has passed through the slit hole 56 and the base end side and the front end side of the first lap belt 42 are sewn, via the folded back portion, at the base end side of the first lap belt 42 relative to the tongue main body 52. Thereby, the first lap belt 42 is connected to the first tongue 50. The tongue main body 52 is integrally formed with a plate-shaped insertion piece 58 which is thinner than the tongue main body 52.

On the other hand, as shown in FIG. 6, the seat 12 includes a second apparatus main body 70. The second apparatus main body 70 includes a second shoulder retractor 72 provided at inside of the seat back 18 on an upper end side of the seat back 18 on a left side in a left and right direction of the seat 12, and a second lap retractor 74 provided at inside of the seat back 18 on a lower end side of the seat back 18 on a left side in a left and right direction of the seat 12.

The second shoulder retractor 72 is basically constructed by a constitution the same as that of the first shoulder retractor 20, as shown in FIG. 1, a second shoulder belt 76 of the second shoulder retractor 72 in correspondence with the first shoulder belt 30 of the first shoulder retractor 20 is extended to the front side of the seat back 18 by passing a slit hole 78 formed at a vicinity of the upper and left end portion of the seat back 18. In contrast thereto, a second lap belt 80 of the second lap retractor 74 in correspondence with the first lap belt 42 of the first lap retractor 40 is extended from a left side face of the seat back 18 to outside of the seat back 18 and is brought to a hollow arm 82 (not illustrated in FIG. 1) attached to the left side face of the seat back 18.

Figure 8:
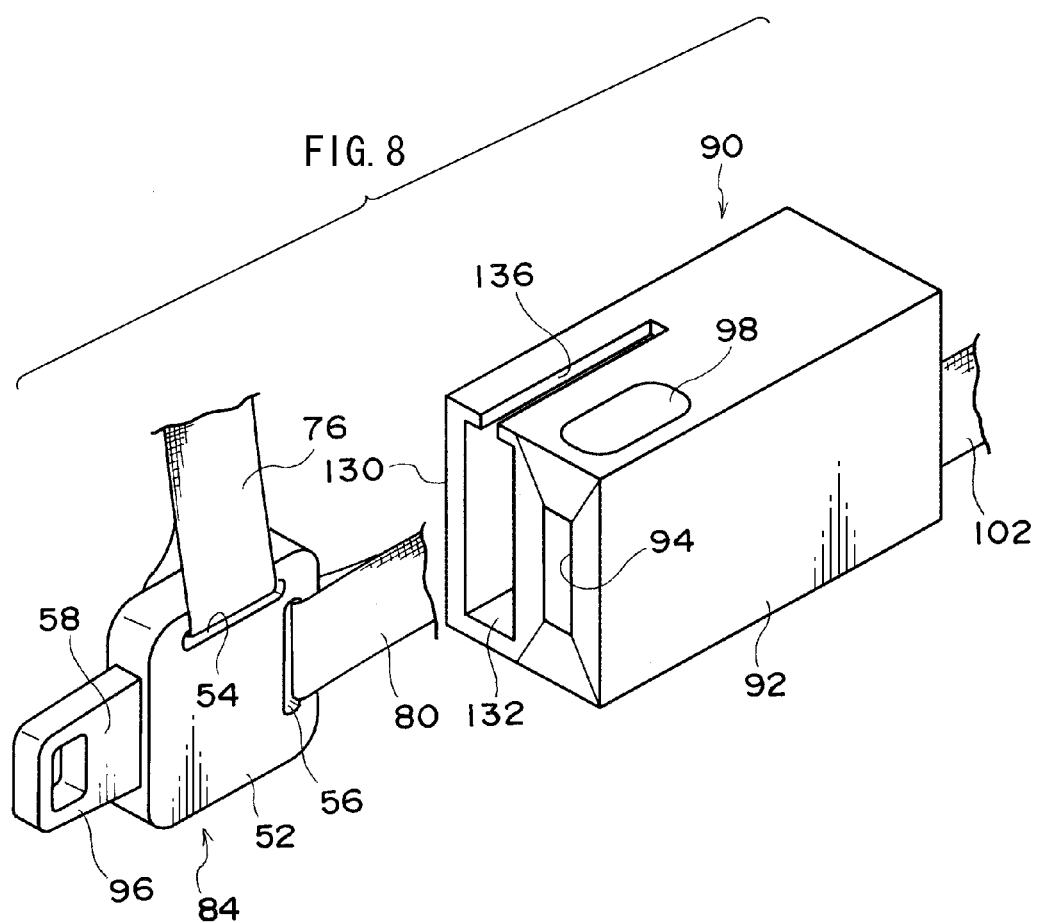
FIG. 8 is a perspective view showing a first buckle, a second tongue, and a second tongue holding portion.

Further, the second apparatus main body 70 includes a second tongue 84 shown in FIG. 8 in correspondence with the two front end portions of the second shoulder belt 76 and the second lap belt 80. The second tongue 84 is basically constructed by a constitution the same as that of the first tongue 50, and the second shoulder belt 76 and the second lap belt 80 are connected to the inserting piece 58 of the second tongue 84 similar to the first shoulder belt 30 and the first lap belt 42.

On the other hand, as shown in FIG. 1, the second apparatus main body 70 includes a first buckle 90. As shown in FIG. 8, the first buckle 90 includes a buckle body 92. The buckle body 92 is formed in a shape of a hollow box and one end portion in a longitudinal direction thereof is formed with an inserting hole 94 capable of inserting the inserting piece 58 of the first tongue 50. Inside of the buckle body 92 contains a lock mechanism constituted by including a latch capable of passing a hole portion 96 formed at the inserting piece 58 of the first tongue 50. When the inserting piece 58 of the first tongue 50 is inserted from the inserting hole 94, the latch at inside of the buckle body 92 is brought to the hole portion 96 to restrict the inserting piece 58 from being pulled out from the buckle body 92.

Further, a release button 98 is provided at an upper face of the buckle body 92. The latch is pulled out from the hole portion 96 when the release button 98 is operated to press such that the latch of the lock mechanism at inside of the buckle body 92 is brought to the hole portion 96 of the inserting piece 58 inserted to inside of the buckle body 92 as described above.

Figure 9:
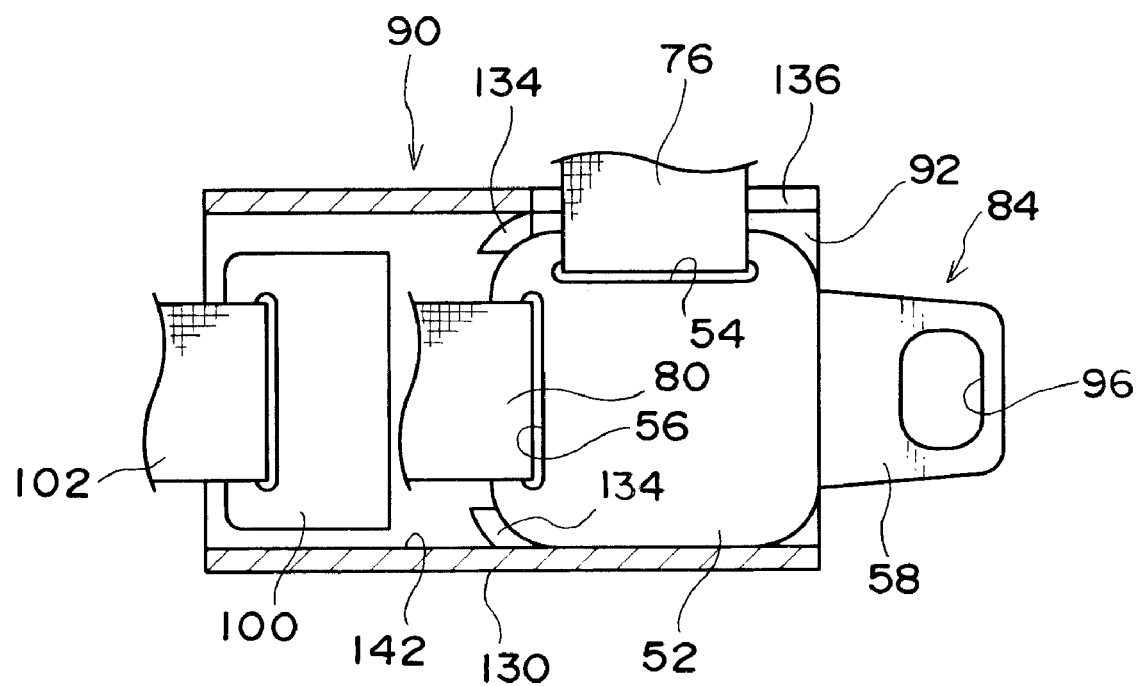
FIG. 9 is a sectional view showing constitutions of the first buckle, the second tongue, and the second tongue holding portion.

As shown in FIG. 9, a side of the buckle body 92 opposed to the inserting hole 94 is integrally fixed with an anchor plate 100. A front end portion of the first connecting belt 102 in a shape of a long strip is held by the anchor plate 100. A base end side in a longitudinal direction of the first connecting belt 102 is brought to an arm 82 shown in FIG. 6 from a front end side of the arm 82, passes the arm 82 and is brought to inside of the seat back 18.

As shown in FIG. 6, inside of the seat back 18 is provided with a first connecting belt reeling apparatus 104 as an urging portion (first urging portion). The first connecting belt reeling apparatus 104 includes the spool 28 which is basically the same as that of the second lap retractor 74 constituting the second apparatus main body 70. A base end portion in a longitudinal direction of the first connecting belt 102 is held by the spool 28 of the first connecting belt reeling apparatus 104. When the spool 28 of the first connecting belt reeling apparatus 104 is rotated in a reeling direction to reel the first connecting belt 102 from the base end side, the first buckle 90 is made to be proximate to a front end portion of the arm 82 attached to the left side face of the seat back 18 to move the first buckle 90 to an initial position in a side direction of the front end portion of the arm 82.

Although the first connecting belt reeling apparatus 104 is constructed by a constitution basically the same as that of the second lap retractor 74 in this way, whereas the lock mechanism of the second lap retractor 74 is operated by detecting the acceleration when the vehicle is brought into the rapid decelerated state and the rapid rotation in the drawing direction of the spool 28, according to the lock mechanism of the first connecting belt reeling apparatus 104, a lock pawl is brought into contact with and separated from the ratchet gear 36 by a solenoid (not illustrated) cooperatively moved with a buckle switch (not illustrated) for detecting whether the inserting piece 58 of the first tongue 50 is inserted to inside of the buckle body 92 of the first buckle 90.

Further, as shown in FIG. 1, the first apparatus main body 19 includes a second buckle 120. As shown in FIG. 10, the second buckle 120 includes the buckle body 92 similar to the first buckle 90, and the insertion piece 58 of the second tongue 84 may be inserted in the inserting hole 94 formed at the buckle body 92. Further, the second buckle 120 contains a lock mechanism at the buckle body 92 similar to the first buckle 90. The inserting piece 58 is restricted from being pulled out from the buckle body 92 by moving a latch to the hole portion 96 of the inserting piece 58 of the second tongue 84 inserted in the inserting hole 94, and the latch is pulled out from the hole portion 96 by pressing the release button 98.

Further, the second buckle 120 is integrally fixed to an anchor plate, not illustrated, provided on a side of the buckle body 92 opposed to the inserting hole 94 similar to the first buckle 90, and a front end portion of a second connecting belt 122 in a shape of a long strip is held by the anchor plate. A base end side in a longitudinal direction of the second connecting belt 122 is brought to the arm 44 from a front end side of the arm 44, passes the arm 44 and is brought to inside of the seat back 18.

As shown in FIG. 6, inside of the seat back 18 is provided with a second connecting belt reeling apparatus 124 as an urging portion (second urging portion). The second connecting belt reeling apparatus 124 is constructed by a constitution basically the same as the first connecting belt reeling apparatus 104, and a base end in a longitudinal direction of the second connecting belt 122 is held by the spool 28 of the second connecting belt reeling apparatus 124. When the spool 28 of the second connecting belt reeling apparatus 124 is rotated in a reeling direction to reel the second connecting belt 122 from the base end side, the second buckle 120 is made to be proximate to the front end portion of the arm 44 of the seat back 18 to move the second buckle 120 to an initial position in a side direction of the front end portion of the arm 44.

Here, as shown in FIG. 8, one side in a thickness direction of the buckle body 92 constituting the first buckle 90 is formed with a second tongue containing portion 130 as a second tongue holding portion. The second tongue containing portion 130 is formed with a containing hole 132 opened at both ends thereof along an opening direction of the inserting hole 94, and the second lap belt 80 passes the containing hole 132. A dimension in a longitudinal direction of an opening shape of the opening portion of the containing hole 132 is larger than a width dimension of the tongue main body 52 constituting the second tongue 84. Further, a width dimension of the opening shape of the opening portion of the containing hole 132 is larger than a thickness dimension of the tongue main body 52 constituting the second tongue 84. Therefore, the tongue main body 52 of the second tongue 84 can be brought to an opening end of the containing hole 132 on a side of the inserting hole 94 from an end portion on an opposed side to the inserting piece 58.

Further, as shown in FIG. 9, an inner side of the second tongue containing portion 130 is formed with a pair of stoppers 134. The pair of stoppers 134 are formed at an inner wall of the second tongue containing portion 130 in a state of providing an interval therebetween equal to or larger than the width dimension of the second lap belt 80 along the width direction of the second lap belt 80 passing inside of the containing hole 132, and the second lap belt 80 passes between the stopper 134 on one side and the stopper 134 on other side.

In a state of containing the second tongue 84 in the containing hole 132, the both stoppers 134 are brought into contact with the tongue main body 52 to restrict the tongue main body 52 from moving to other opening end (opening end on a side opposed to the inserting hole 94 of the containing hole 132) at inside of the containing hole 132. Further, a slit hole 136 is formed at an upper wall of the second tongue containing portion 130. The slit hole 136 is opened also at a face of the second tongue containing portion 130 on a side of the inserting hole 94. In a state of containing the second tongue 84 in the containing hole 132, the second shoulder belt 76 passes the slit hole 136.

On the other hand, as shown in FIG. 10, a first tongue containing portion 140 as a first tongue holding portion is formed on other side in a thickness direction of the buckle body 92 constituting the second buckle 120. The first tongue portion 140 is constructed by a constitution basically the same as that of the second tongue containing portion 130 formed at the first buckle 90, the first lap belt 42 passes the containing hole 132 of the first tongue containing portion 140, and the tongue main body 52 is made to be able to be contained in the containing hole 132.

However, a position of forming the first tongue containing portion 140 relative to the buckle body 92 of the second buckle 120 is opposed to a position of forming the second tongue containing portion 130 relative to the buckle body 92 of the first buckle 90. For example, when the first buckle 90 and the second buckle 120 are arranged on a front side of the waist portion of the occupant 150 seated on the seat 12, the second tongue containing portion 130 of the first buckle 90 is disposed between the waist portion of the occupant 150 and the buckle body 92, however, the first tongue containing portion 140 of the second buckle 120 is disposed on a side of the buckle body 92 opposed to the waist portion of the occupant (that is, front side).

Therefore, the inserting piece 58 of the second tongue 84 is opposed to the inserting hole 94 of the second buckle 120 when the inserting hole 94 of the first buckle 90 and the inserting piece 58 of the first tongue 50 are opposed to each other such that the first tongue 50 is contained in the first tongue containing portion 140 and the second tongue 84 is contained in the second tongue containing portion 130.

Operation, Effect of First Embodiment

Next, an operation and an effect of the embodiment will be explained.

Figure 2:
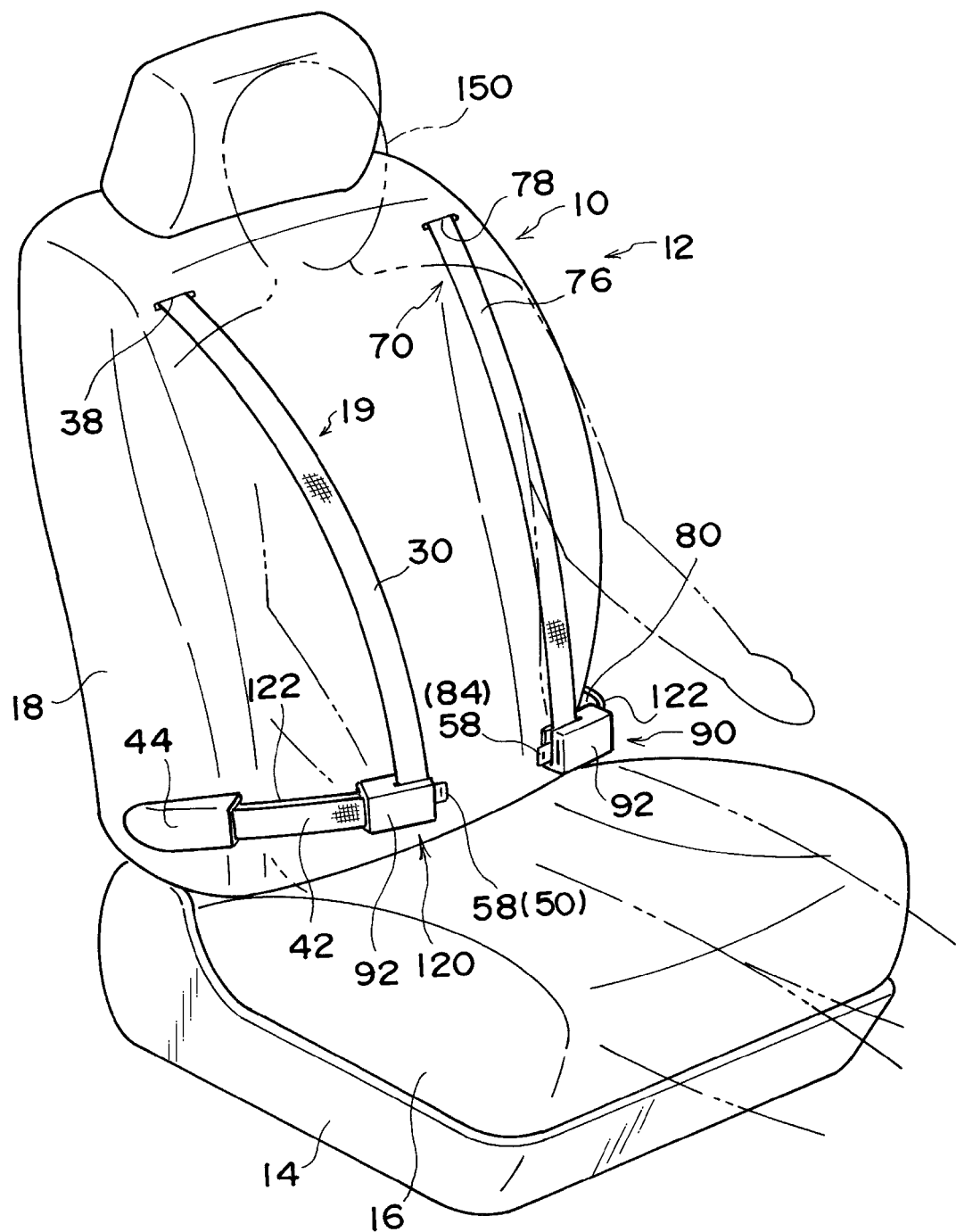
FIG. 2 is a perspective view in correspondence with FIG. 1 showing a state of pulling to move two buckles.

When the occupant 150 seated on the seat 12 is mounted with the first shoulder belt 30, the first lap belt 42, the second shoulder belt 76, and the second lap belt 80, as shown in FIG. 2, the second buckle 120 disposed at a first initial position at a vicinity of the front end portion of the arm 44 is pulled to be moved to the front side of the waist portion against urge forces of the respective spiral springs of the first shoulder retractor 20, the first lap retractor 40, and the second connecting belt reeling apparatus 124.

Further, simultaneously with pulling the second buckle 120 or respectively before and after pulling the second buckle 120, the first buckle 90 disposed at a second initial position in a vicinity of the front end portion of the arm 82 is pulled to the front side of the waist portion in resistance to urge forces of the respective spiral springs of the second shoulder retractor 72, the second lap retractor 74, and the first connecting belt reeling apparatus 104.

Figure 3:
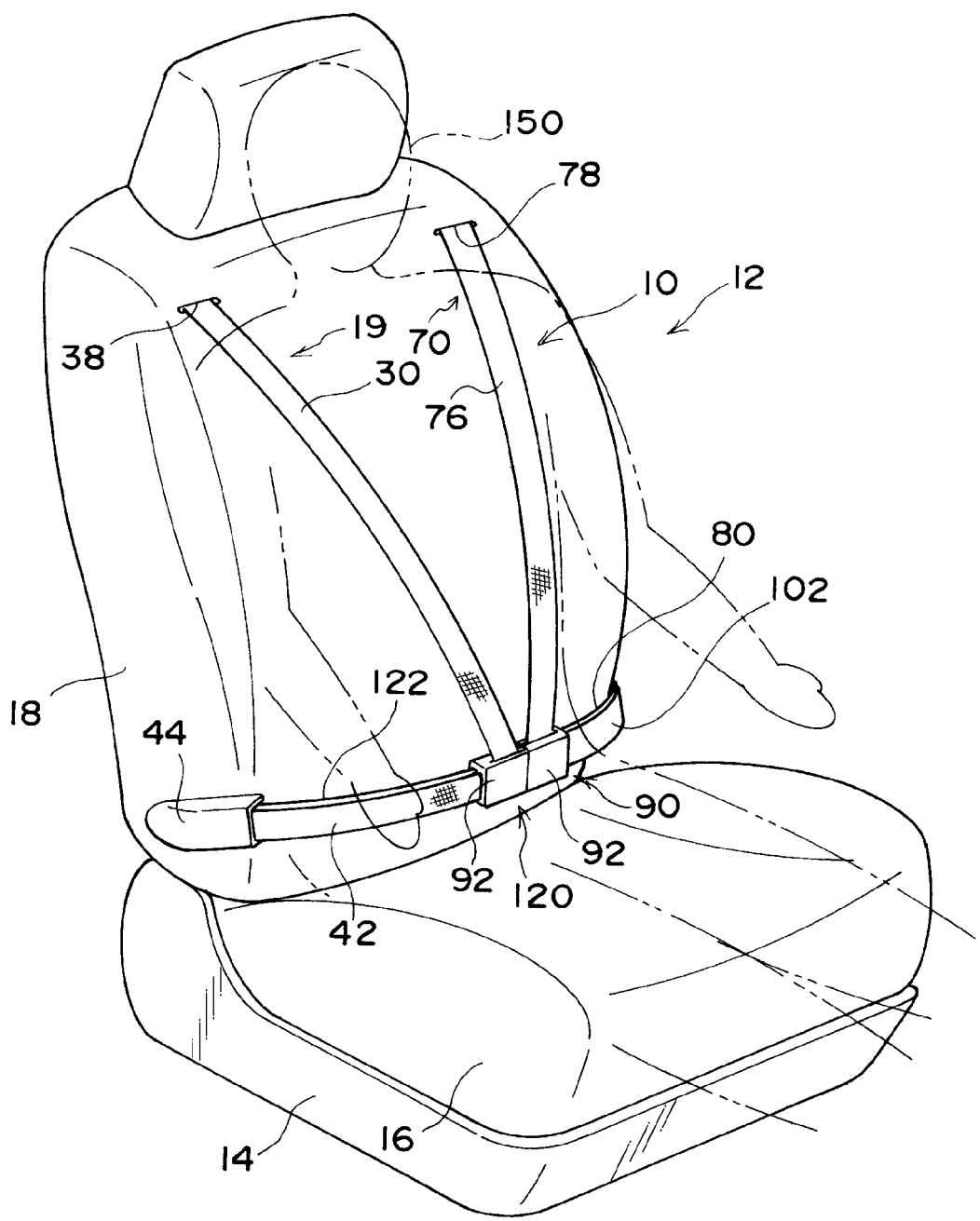
FIG. 3 is a perspective view in correspondence with FIG. 1 showing a state of having mounted two tongues to the two buckles.
Figure 11A:
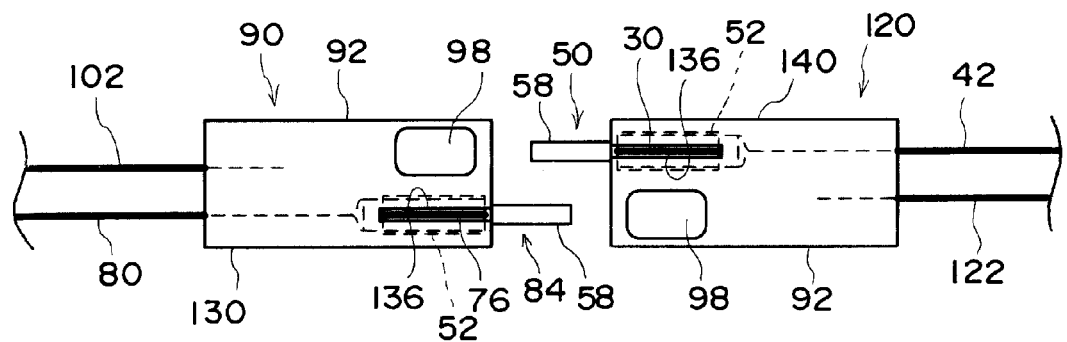
FIG. 11A is a plane view showing an outline of a state of mounting a first tongue to a first buckle and mounting a second tongue to a second buckle, and is a view showing a state in which the first tongue and the first buckle are opposed to each other and the second tongue and the second buckle are opposed to each other.
Figure 11B:
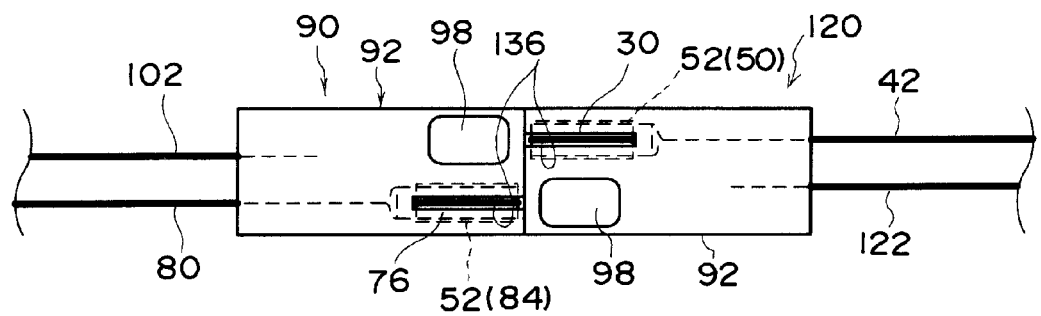
FIG. 11B is a plane view showing an outline of the state of mounting the first tongue to the first buckle and mounting the second tongue to the second buckle and is a view showing a state in which the first tongue is mounted to the first buckle and the second tongue is mounted to the second buckle.

Under the state, as shown in FIG. 11A, the inserting hole 94 of the first buckle 90 and the inserting piece 58 of the first tongue 50 are opposed to each other and the inserting piece 58 of the second tongue 84 and the inserting hole 94 of the second buckle 120 are opposed to each other. When under the state, the first buckle 90 and the second buckle 120 are made to be proximate to each other and as shown in FIG. 3 and FIG. 11B, the inserting piece 58 of the first tongue 50 is inserted to the inserting hole 94 of the first buckle 90, the inserting piece 58 of the second tongue 84 is inserted to the inserting hole 94 of the second buckle 120.

When the inserting piece 58 of the first tongue 50 is inserted to the inserting hole 94 of the first buckle 90, the latch of the lock mechanism provided at inside of the buckle body 92 of the first buckle 90 is brought to the hole portion 96 formed at the inserting piece 58 of the first tongue 50 to restrict the inserting piece 58 from being drawn from the first buckle 90. Further, when the inserting piece 58 of the second tongue 84 is inserted to the inserting hole 94 of the second buckle 120, the latch of the lock mechanism provided at inside of the buckle body 92 of the second buckle 120 is brought to the hole portion 96 formed at the inserting piece 58 of the second tongue 84 to restrict the inserting piece 58 from being drawn from the second buckle 120.

Figure 4:
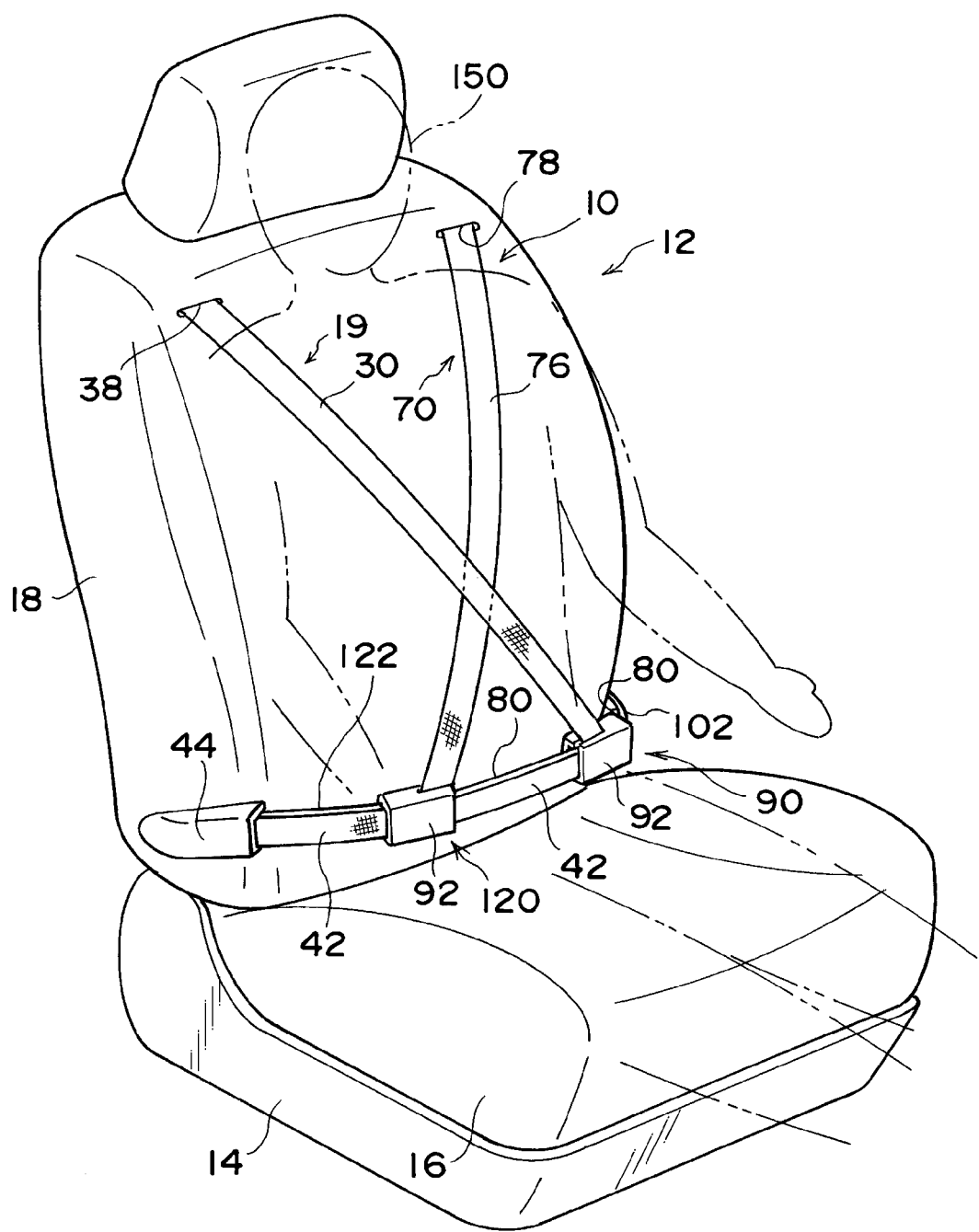
FIG. 4 is a perspective view in correspondence with FIG. 1 showing a state of returning the two buckles to two initial positions along with the two tongues.
Figure 5:
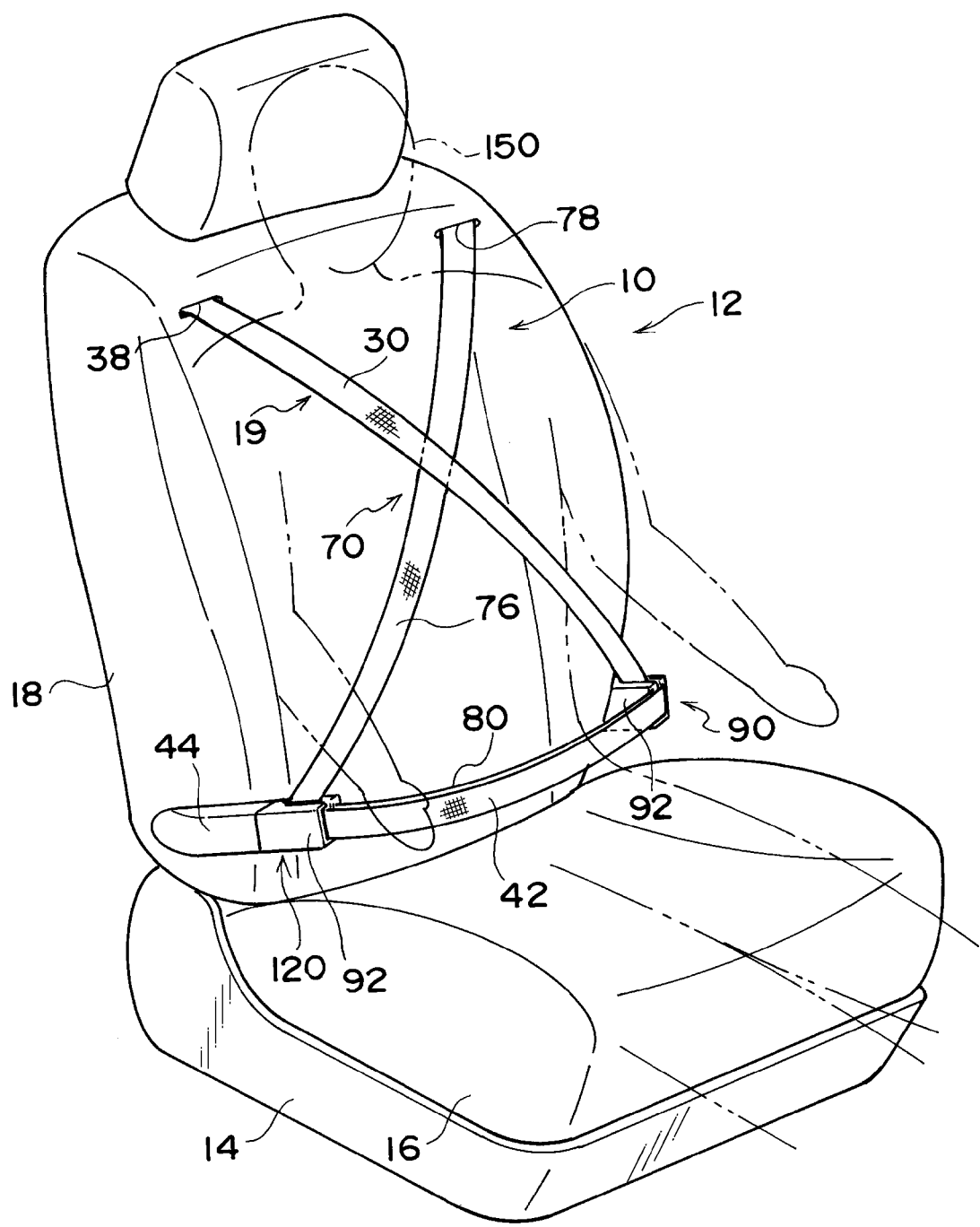
FIG. 5 is a perspective view in correspondence with FIG. 1 showing a state of having returned the two buckles to the two initial positions.
Figure 11C:
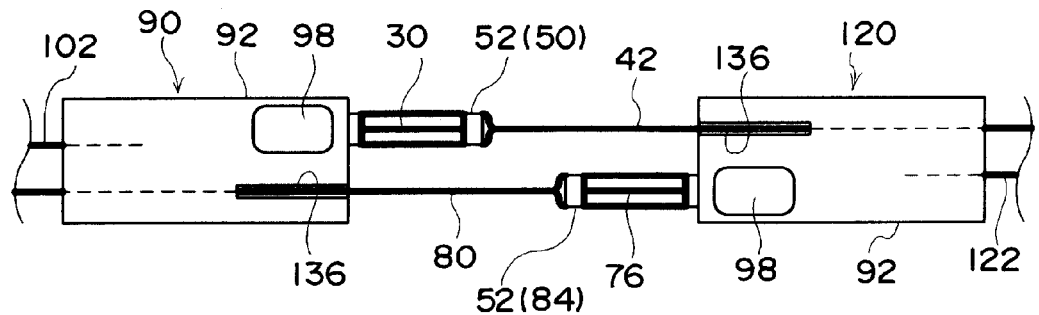
FIG. 11C is a plane view showing an outline of the state of mounting the first tongue to the first buckle and mounting the second tongue to the second buckle and is a view showing a state in which the first buckle is moved along with the first tongue and the second buckle is moved along with the second tongue.

When the first buckle 90 is released from being pulled under the state, the spiral spring of the first connecting belt reeling apparatus 104 rotates the spool 28 of the first connecting belt reeling apparatus 104 in the reeling direction to reel and contain the first connecting belt 102. When the first buckle 90 is moved to a vicinity of the front end portion of the arm 82 thereby as shown in FIG. 4 and FIG. 11C, the first tongue 50 engaged with the latch of the first buckle 90 is moved along with the first buckle 90 and the first tongue 50 is pulled out from the containing hole 132 of the first tongue containing portion 140 as shown by FIG. 5. Thereby, the first shoulder belt 30 held by the tongue main body 52 of the first tongue 50 extends around the left waist portion from the front side of the right shoulder portion of the occupant 150 via of the front side of the right chest portion and the first lap belt 42 also extends around from the right waist portion to the left waist portion.

Further, when the second buckle 120 is released from being pulled simultaneously with releasing the first buckle 90 from being pulled or respectively before and after releasing the first buckle 90 from being pulled, the spiral spring of the second connecting belt reeling apparatus 124 rotates the spool 28 of the second connecting belt reeling apparatus 124 in the reeling direction to reel in and contain the second connecting belt 122. When the second buckle 120 is moved to a vicinity of the front end portion of the arm 44 attached to the right side face of the seat back 18, the second tongue 84 engaged with the latch of the second buckle 120 is moved together with the second buckle 120 and the second tongue 84 is pulled out from the containing portion 132 of the second tongue containing portion 130. Thereby, the second shoulder belt 76, held by the tongue main body 52 of the second tongue 84, extends around the right waist portion from the front side of the left shoulder portion of the occupant 150 via the front side of the left chest portion, and the second lap belt 80 extends from the left waist portion to the right waist portion.

In this way, the waist portion of the occupant 150 is held by the first lap belt 42 and the second lap belt 80, further, the first shoulder belt 30 and the second shoulder belt 76 hold the two chest portions from the two shoulder portions of the occupant 150 in a cross state (X-like state) on the front side of the occupant 150, and therefore, the body of the occupant 150 can be constrained more tightly than the three points type seat belt apparatus of the related art.

Here, according to the embodiment, as described above, when the inserting piece 58 of the first tongue 50 is inserted to the inserting hole 94 of the first buckle 90, the inserting piece 58 of the second tongue 84 is inserted to the inserting hole 94 of the second buckle 120, and therefore, insertion of the inserting piece 58 of the first tongue 50 to the inserting hole 94 of the first buckle 90 and insertion of the inserting piece 58 of the second tongue 84 to the inserting hole 94 of the second buckle 120 are basically finished by one operation. Therefore, a mounting operation is extremely simplified.

Further, the first buckle 90 and the second buckle 120 are moved to the front side of the occupant 150 and to the center side in the width direction of the seat 12 by pulling both of the first buckle 90 and the second buckle 120, and therefore, the occupant 150 can carry out the mounting operation without twisting the upper body and the mounting operation is simplified in this aspect.

Further, according to the embodiment, a constitution of inserting the inserting piece 58 of the first tongue 50 to the inserting hole 94 of the first buckle 90 and inserting the inserting piece 58 of the second tongue 84 to the inserting hole 94 of the second buckle 120 by grabbing and pulling the first buckle 90 and the second buckle 120 by the occupant 150, that is, the mounting operation of the first shoulder belt 30, the first lap belt 42, the second shoulder belt 76, and the second lap belt 80 is basically constructed by a manual constitution.

However, a configuration is possible in which, for example, the first buckle 90 is attached to a front end portion of a bracket that moves along the right side of an outer peripheral portion of the seat base 14, the second buckle 120 is attached to a front end portion of a bracket that moves along the left side of an outer peripheral portion of the seat base 14, and by moving the two brackets by a drive force of a drive portion of a motor or the like, the first buckle 90 is moved to a position at which the inserting hole 94 of the first buckle 90 and the inserting piece 58 of the first tongue 50 are opposed to each other, and the second buckle 120 is moved to a position at which the inserting piece 58 of the second tongue 84 and the inserting hole 94 of the second buckle 120 are opposed to each other. In such a configuration, when the drive portion of a motor or the like is moved cooperatively with a seating sensor for detecting whether the occupant 150 is seated on the seat 12, the mounting operation can be automated.

Further, according to the embodiment, the front end portion of the first shoulder belt 30 and the front end portion of the first lap belt 42 are held by the first tongue 50. However, a configuration is possible in which the first shoulder belt 30 and the first lap belt 42 are constituted by one piece of a webbing belt and the webbing belt is made to pass a slit hole formed at the first tongue 50 as in the three points type seat belt apparatus of the related art. In such a configuration, the first shoulder retractor 20 or the first lap retractor 40 is dispensed with, and therefore, the cost becomes inexpensive.

Figure 12:
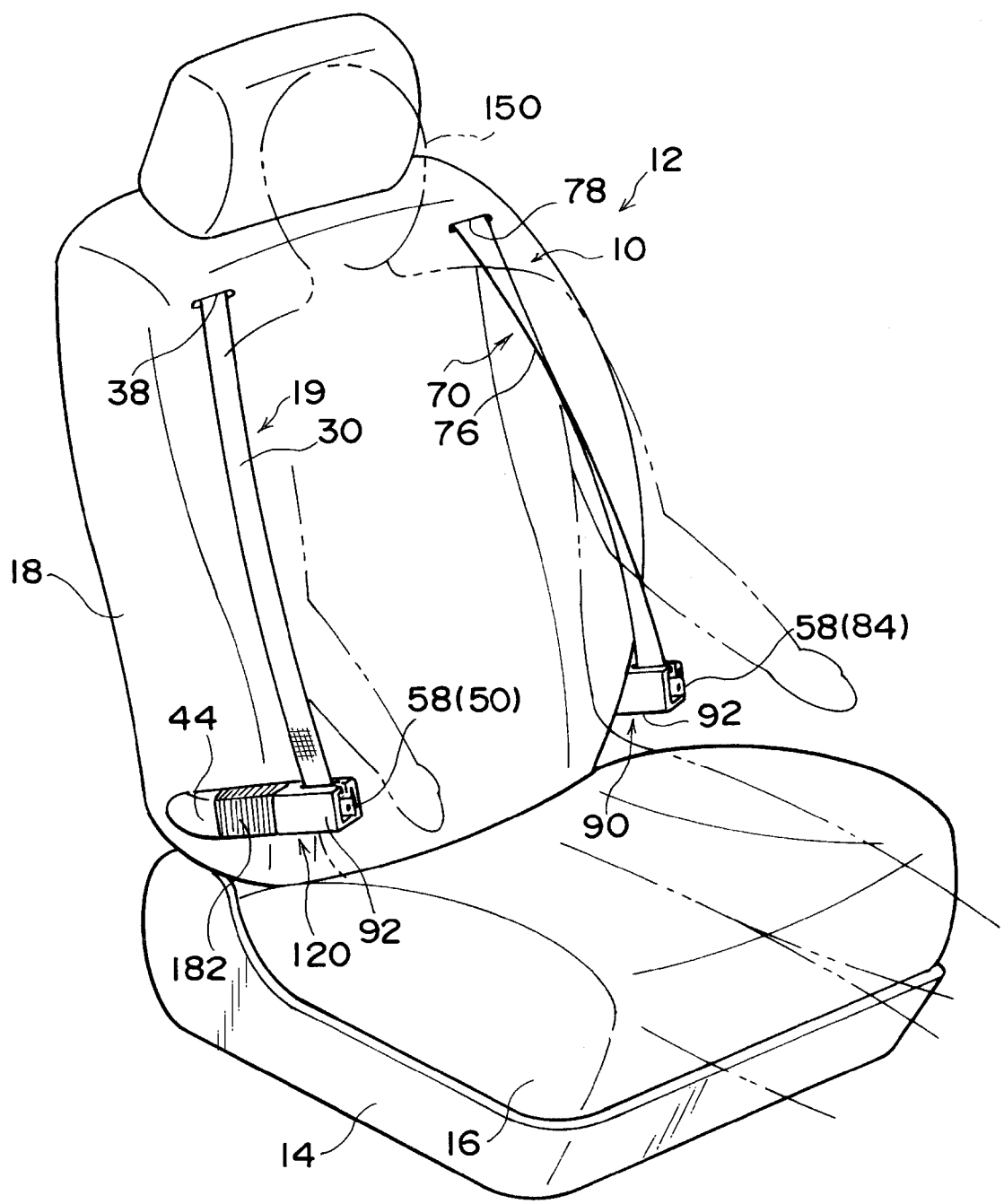
FIG. 12 is a perspective view in correspondence with FIG. 1 showing a modified example of the first embodiment of the invention.
Figure 13:
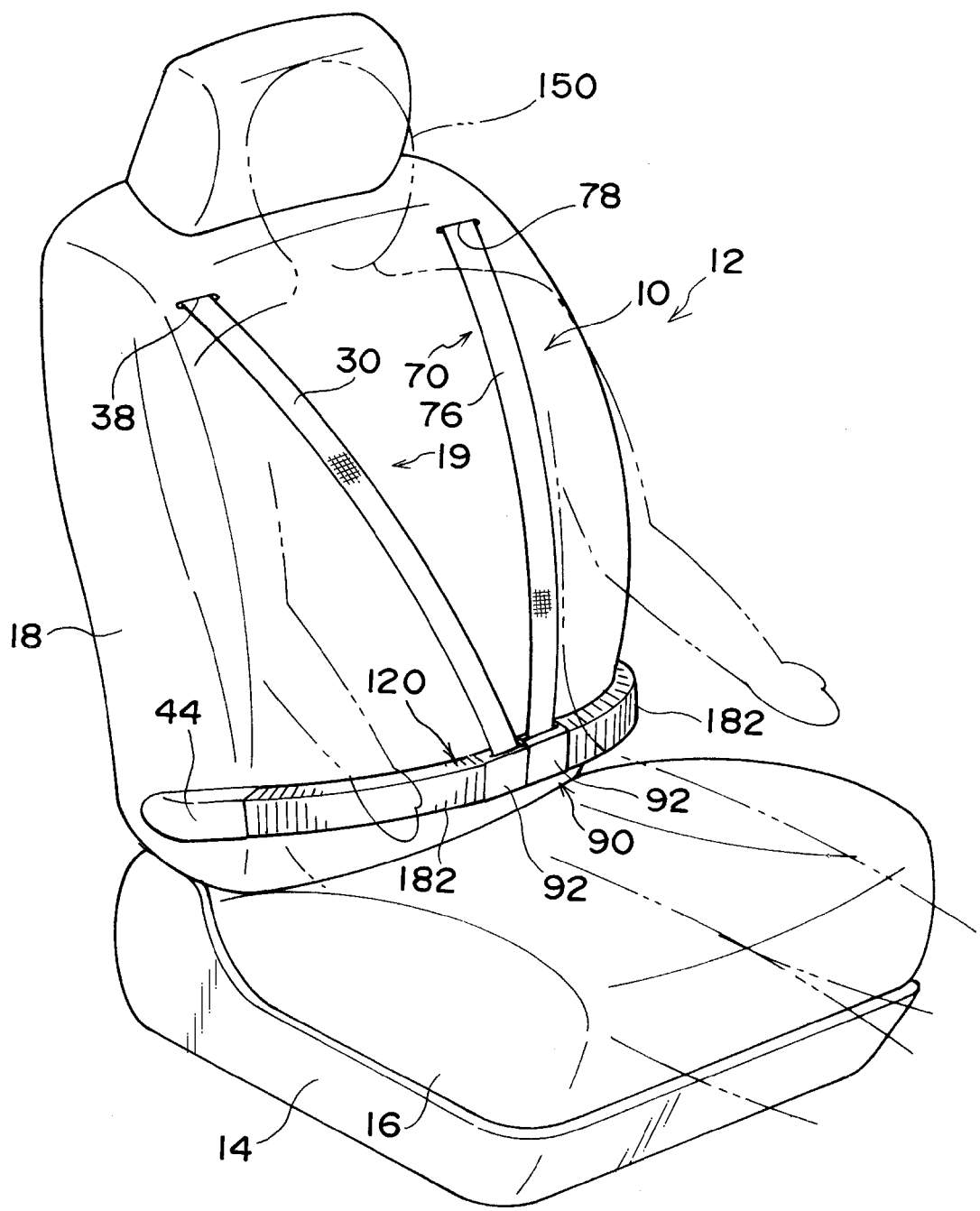
FIG. 13 is a perspective view in correspondence with FIG. 3 showing the modified example of the first embodiment of the invention.
Figure 14:
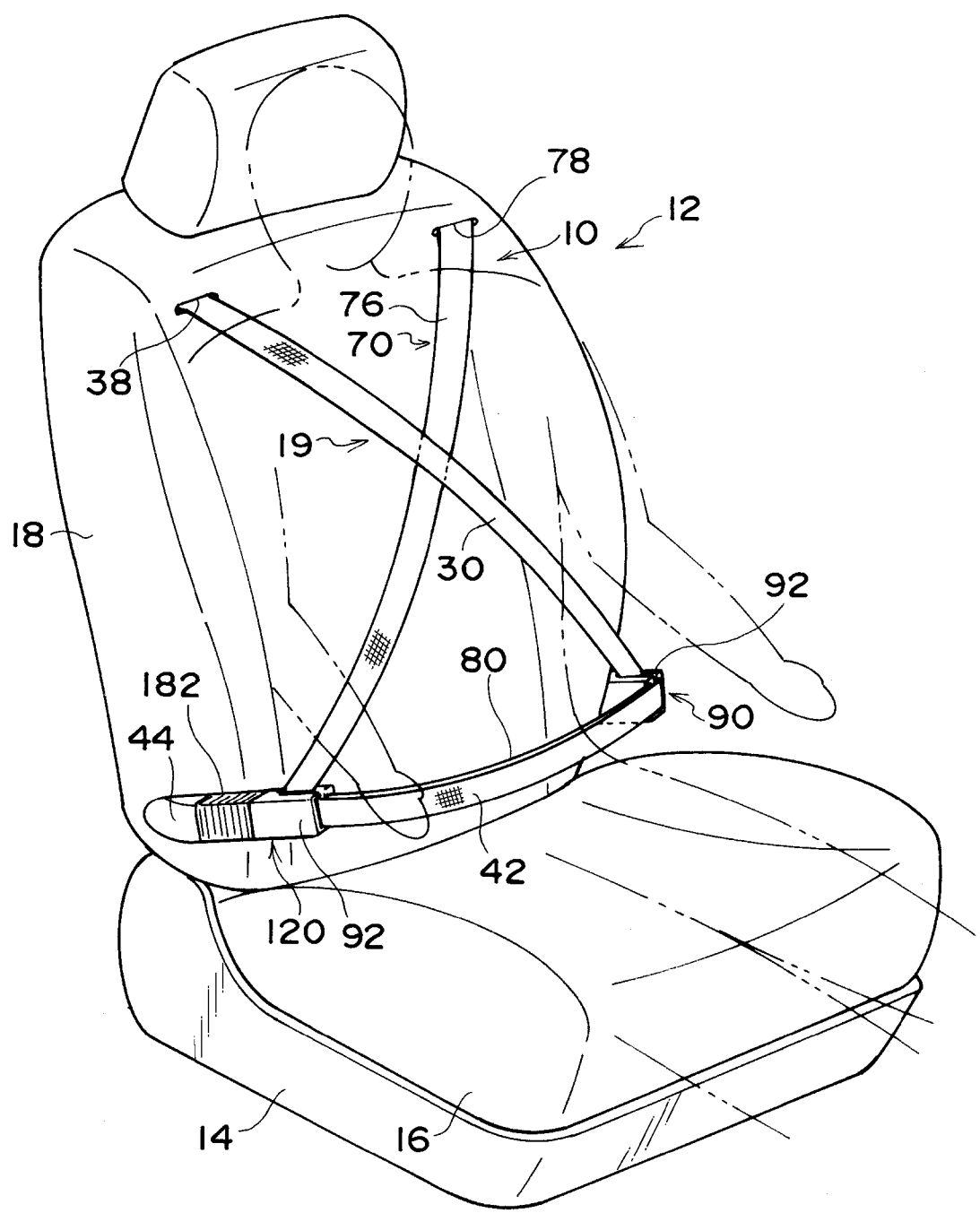
FIG. 14 is a perspective view in correspondence with FIG. 5 showing the modified example of the first embodiment of the invention.

Further, although according to the embodiment, the front end portion of the first connecting belt 102 is held by the buckle body 92 of the first buckle 90 and the first buckle 90 is connected to the seat 12 moveably via the first connecting belt 102 and the first connecting belt reeling apparatus 104. For example, as in operation views of modified examples of FIG. 12, FIG. 13, FIG. 14, a configuration is possible in which the front end portion of the arm 44 and the end portion on a side opposite to the inserting hole 94 of the first buckle 90 are connected by a cylinder member 182 in a bellows shape expansible and contractible in an insertion direction.

In such a configuration, it is preferable that the first lap belt 42 and the first buckle 90 are mechanically connected such that the first buckle 90 is close to a front end portion of the first lap belt 42, and that a connecting portion is provided that restricts movement of the first buckle 90 in a direction of separation from the first lap belt 42, further, that the occupant 150 is not moved in the direction of separation from the first lap belt 42, even when the occupant 150 pulls the first shoulder belt 30 when the vehicle is rapidly decelerating. Further, in this configuration, the first connecting belt reeling apparatus 104 and the second connecting belt reeling apparatus 124 are not present, and therefore, the first buckle 90 and the second buckle 120 cannot be pulled back by the respective spiral springs of the first connecting belt reeling apparatus 104 and the second connecting belt reeling apparatus 124. As a result, it is preferable to use a configuration in which the first buckle 90 and the second buckle 120 are moved by a drive portion of a motor or the like, as described above.

Further, according to the embodiment, the occupant basically pulls to move the first buckle 90 and the second buckle 120 manually to the front side of the waist portion Further, the inserting piece 58 of the first tongue 50 is inserted to the inserting hole 94 of the first buckle 90 and the inserting piece 58 of the second tongue 84 is inserted to the inserting hole 94 of the second buckle 120.

However, the movement of the first buckle 90 and the second buckle 120 to the front side of the waist portion by the occupant, or the movement of the first buckle 90 and the second buckle 120 when the first buckle 90 and the second buckle 120 return to a side of the occupant after engaging the first tongue 50 with the first buckle 90 and engage the second tongue 84 with the second buckle 120 may be carried out by a drive force of a drive portion of a motor or the like. An example thereof will be explained as follows as a second embodiment of the invention.

Constitution of Second Embodiment

Figure 15:
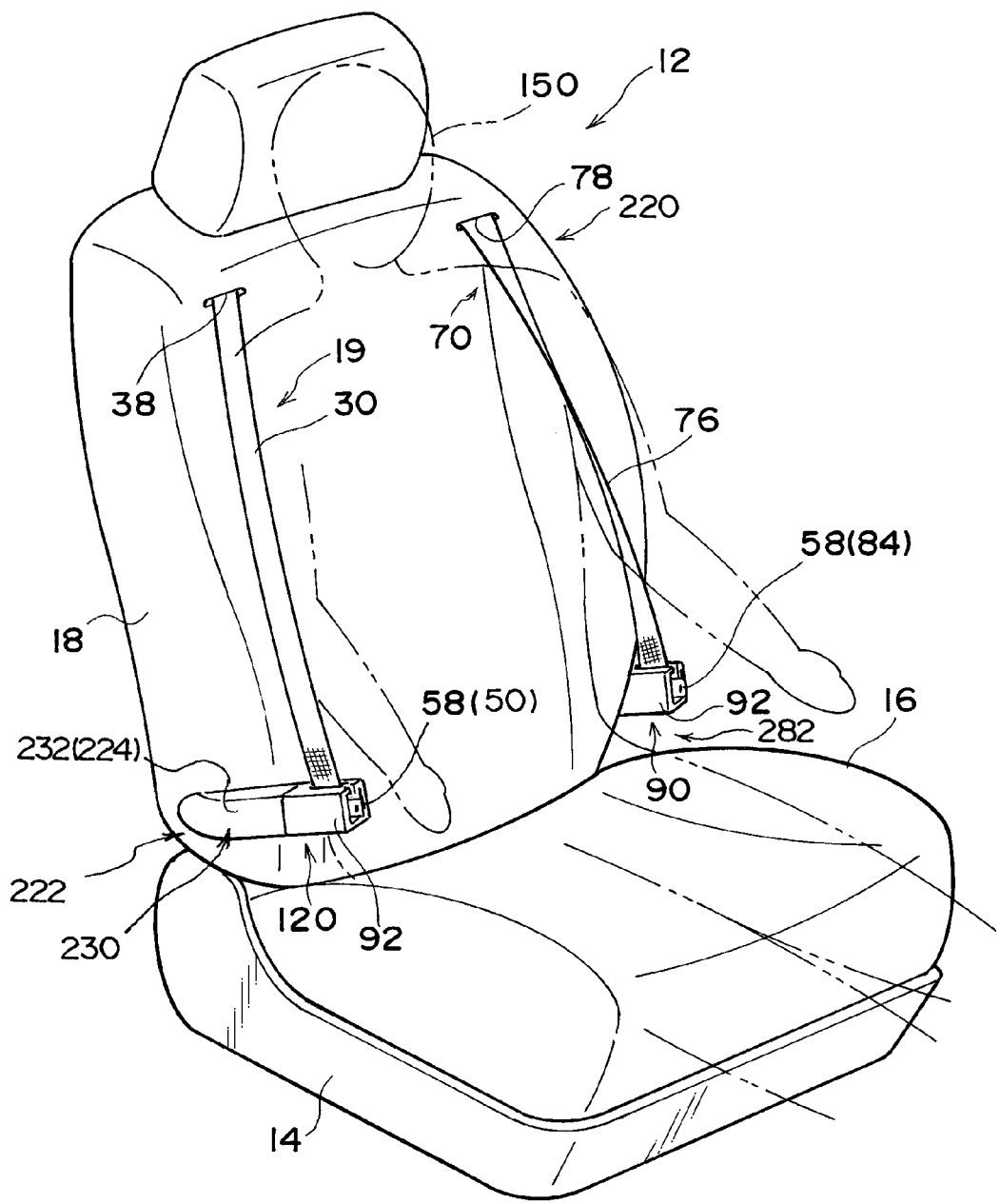
FIG. 15 is a perspective view in correspondence with FIG. 1 of a seat mounted with a seat belt apparatus according to a second embodiment of the invention.
Figure 16:
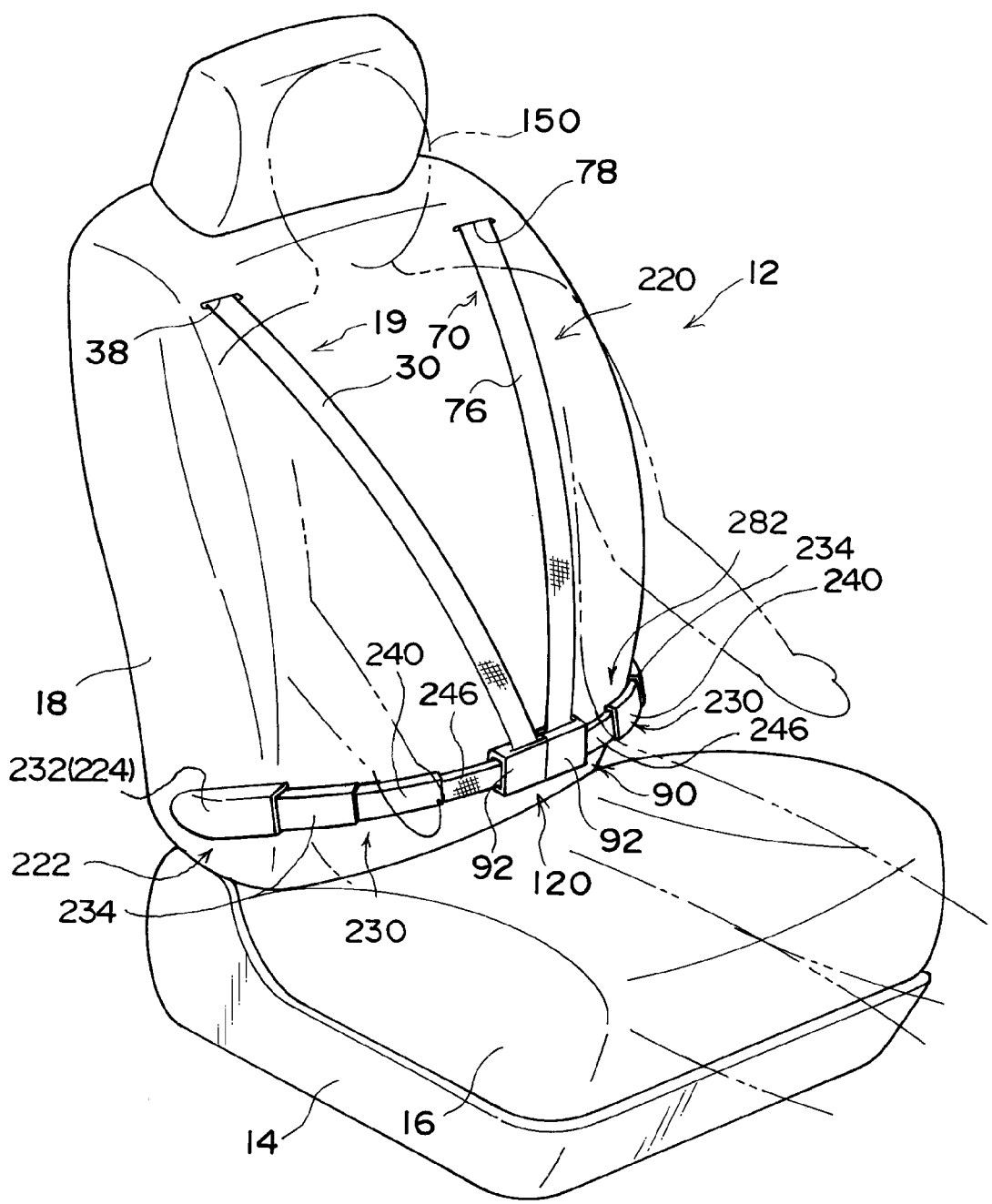
FIG. 16 is a perspective view in correspondence with FIG. 15 showing a state of operating a buckle moving apparatus (buckle moving portion)
Figure 17:
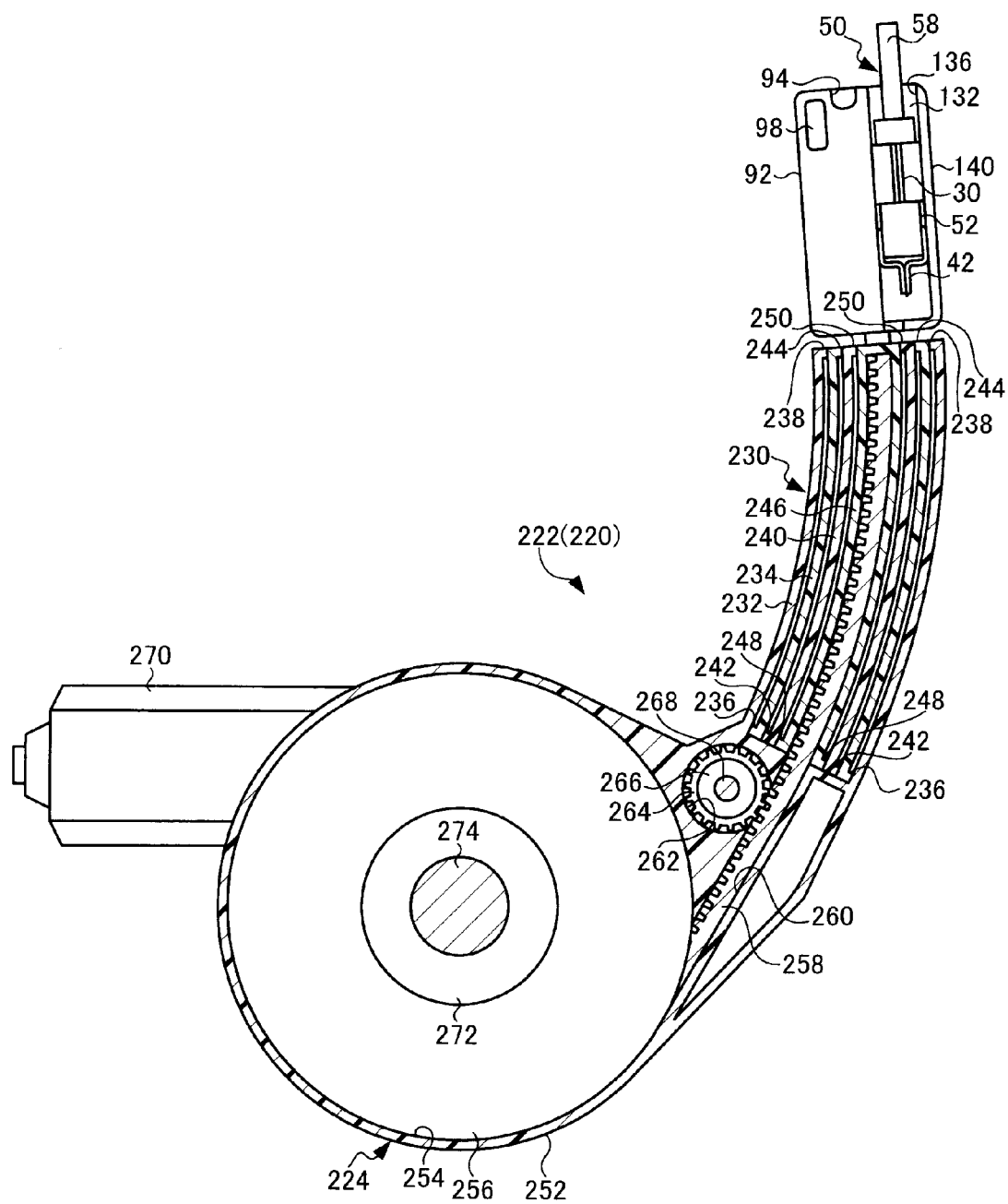
FIG. 17 is a plane sectional view of a buckle moving apparatus (buckle moving portion)
Figure 18:
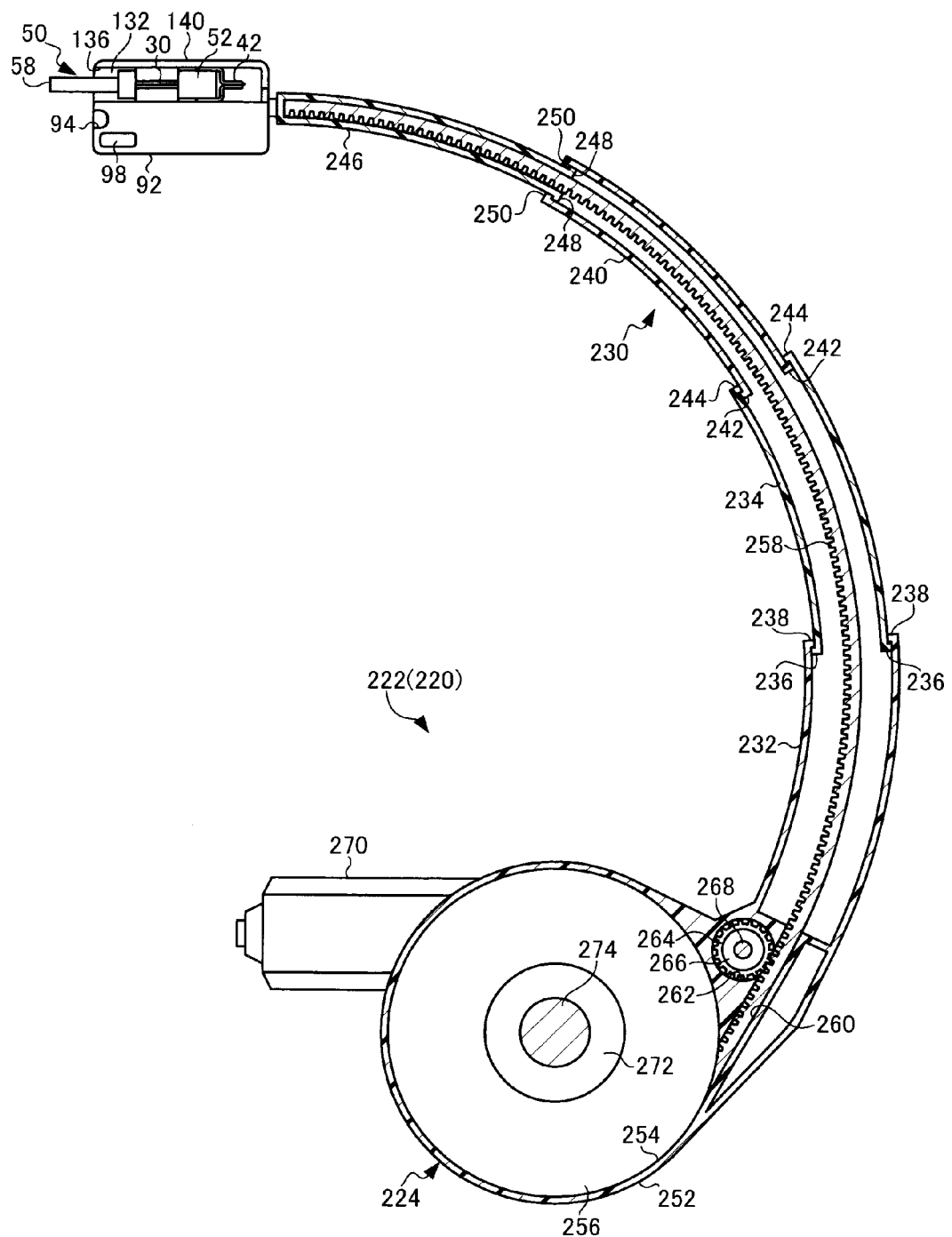
FIG. 18 is a plane sectional view in correspondence with FIG. 17 showing a state of operating the buckle moving apparatus (buckle moving portion)

FIG. 15 shows an outline of a seat belt apparatus 220 according to a second embodiment of the invention by a perspective view in correspondence with FIG. 1 and FIG. 16 shows an outline of the seat belt apparatus 220 by a perspective view in correspondence with FIG. 3. Further, FIG. 17 shows a constitution of a buckle moving apparatus 222 as a buckle moving portion constituting an essential portion of the seat belt apparatus 220 by a plane sectional view, and FIG. 18 shows a state of operating the buckle moving apparatus 222 (state in correspondence with FIG. 16) by a plane sectional view. Further, in explaining the embodiment, portions basically the same as those of the first embodiment are attached with the same notations and a detailed explanation thereof will be omitted.

As shown in FIG. 17 and FIG. 18, the buckle moving apparatus 222 of the seat belt apparatus 220 includes a housing 224. The housing 224 includes a first arm 232 which corresponds to the arm 44 according to the first embodiment. The first arm 232 forms part of an expanding and contracting arm 230. The first arm 232 is formed into a hollow shape, and an outer face and an inner portion thereof are bent to form a curve that takes as its center of curvature a predetermined position further to a center side in a width direction of the first lap retractor 40 than the first arm 232. Further, a tip end (front end) of the first arm 232 along a front and rear direction of the seat 12 is open to communicate the inside and outside of the first arm 232.

A second arm 234 is contained at an inner side of the first arm 232. The second arm 234 has a hollow shape similar to the first arm 232 and an outer face and an inner portion thereof are bent to form a curve with substantially the same center of curvature as that of the first arm 232. Further, a tip end (front end) of the second arm 234 disposed along the front and rear direction of the seat 12 and contained at the inner side of the first arm 232 is open to communicate the inside and outside thereof. Further, an outer flange 236 extends from a base end portion (an end portion at a side opposed to the front end) of the second arm 234 to an outer side.

A front end portion of the outer flange 236 is brought into contact with an inner peripheral wall of the first arm 232, and when the second arm 234 is moved so that it projects from the opening of the tip end of the first arm 232, the outer flange 236 is brought into sliding contact with the inner peripheral wall of the first arm 232. Thereby, the second arm 234 is slid to an outer side from the tip end of the first arm 232 by following the curve of the first arm 232.

Further, in correspondence with the outer flange 236, an inner flange 238 extends from the tip end of the first arm 232 towards an inner side of the first arm 232. The second arm 234 can be slid until the outer flange 236 is brought into contact with the inner flange 238, and by bringing the outer flange 236 into contact with the inner flange 238, further movement of the second arm 234 in a drawing-out direction from the first arm 232 may be restricted.

Further, an inner side of the second arm 234 contains a third arm 240. The third arm 240 has by a hollow shape similar to the first arm 232 and the second arm 234, and an outer face and an inner portion thereof are bent to form a curve with a center of curvature substantially the same as the center of curvature of the first arm 232 or the second arm 234. Further, a tip end (front end) of the third arm 240 along the front and rear direction of the seat 12 contained at an inner side of the second arm 234 is open to communicate the inside and outside thereof. Further, an outer flange 242 extends from a base end portion (an end portion at a side opposed to the tip end) of the third arm 240 towards an outer side.

A front end portion of the outer flange 242 is brought into contact with an inner peripheral wall of the second arm 234, and when the third arm 240 is moved to project from an opening of the front end of the second arm 234, the outer flange 242 is brought into sliding contact with the inner peripheral wall of the second arm 234. Thereby, the third arm 240 is slid to the outside from a front end of the second arm 234 by following the curve of the second arm 234. Further, an inner flange 242 extends from the front end of the second arm 234 towards an inner side of the second arm 234 in correspondence with the outer flange 242. The third arm 240 can be slid until the outer flange 242 is brought into contact with the inner flange 244, and by bringing the outer flange 242 into contact with the inner flange 244, further movement of the third arm 240 in a drawing-out direction from the second arm 234 is restricted.

Further, the inner side of the third arm 240 contains a fourth arm 246. The fourth arm 246 has a hollow shape similar to the first arm 232, the second arm 234, the third arm 240, further, an outer face and inner portion thereof are bent to form a curve having a center of curvature substantially the same as the center of the curvature of the first arm 232 and the second arm 234. However, a front end of the fourth arm 246 is closed by a bottom wall, which is different from the first arm 232, the second arm 234, and the third arm 240.

An outer flange 248 extends from a base end portion (end portion on a side opposed to the front end) of the fourth arm 246 towards an outer side. The front end portion of the outer flange 248 is brought into contact with an inner peripheral wall of the third arm 240, and when the fourth arm 246 is moved to project from an opening of the front end of the third arm 240, the outer flange 248 is brought into sliding contact with the inner peripheral wall of the third arm 240. Thereby, the fourth arm 246 is slid from the front end of the third arm 240 towards an outer side by following the curve of the third arm 240.

Further, an inner flange 250 extends from the front end of the third arm 240 towards an inner side of the third arm 240 in correspondence with the outer flange 248. The fourth arm 246 can be slid until the outer flange 248 is brought into contact with the inner flange 250, and by bringing the outer flange 248 into contact with the inner flange 250, a further movement of the fourth arm 246 in a drawing-out direction from the third arm 240 is restricted.

As shown in FIG. 18, when the second arm 234 is projected from the first arm 232 until the outer flange 236 is brought into contact with the inner flange 238, the third arm 240 is projected from the second arm 234 until the outer flange 242 is brought into contact with the inner flange 244, and the fourth arm 246 is projected from the third arm 240 until the outer flange 248 is brought into contact with the inner flange 250, the bottom wall (front end) of the fourth arm 246 is substantially directed towards the center in the width direction of the seat 12. The bottom wall of the fourth arm 246 is integrally connected with the second buckle 120.

As shown in FIG. 17, the housing 224 includes a gear box portion 252. The gear box portion 252 is formed with a reel containing portion 254, and an inner side thereof contains a reel 256 rotatable around an axis having an axial direction in a substantially vertical direction of the seat 12. In the reel 256, a long extrusion belt 258 is wound from a base end side in a longitudinal direction thereof and contained. Unlike the first lap belt 42, the extrusion belt 258 is formed from a rubber material, a synthetic resin material, or a metal or the like, and is imparted with a spring property whereby it extends in a length direction and assumes a linear shape, and the base end side in the length direction thereof is wound around the reel 256 in resistance to the spring property thereof.

Further, the gear box portion 252 is formed with a belt guide 260. An inner width of the belt guide 260 is slightly larger than a width dimension of the extrusion belt 258, one end thereof is opened at the reel containing portion 254 and the other end thereof is opened at a bottom portion of the first arm 232, which is integrated with the gear box portion 252. The extrusion belt 258 is guided by the belt guide 260 and enters at an inner side of the first arm 232, and the front end of the extrusion belt 258 is integrally fixed to a bottom portion of the fourth arm 246 at an inner side of the fourth arm 246.

A gear containing portion 262 is formed at a side of a middle portion of the belt guide 260, and a feed gear 264 is contained at an inner side thereof, rotatably around an axis having an axial direction in a substantially vertical direction of the seat 12. The feed gear 264 is an outer teeth gear, and engages teeth intermittently formed along the longitudinal direction of the extrusion belt 258 at one end portion in a width direction of the extrusion belt 258. Therefore, when the feed gear 264 is rotated regularly, a portion of the extrusion belt 258 wound around the reel 256 is pulled out by being pulled towards a front end side thereof and is fed to an inner side of the first arm 232.

The feed gear 264 is connected to a rotating shaft 268 by a one way clutch 266. The one way clutch 266 is configured such that it transmits only regular rotation of the rotating shaft 268 to the feed gear 264, and does not transmit reverse rotation of the rotating shaft 268 to the feed gear 264, further, regular or reverse rotations of the feed gear 264 are not transmitted to the rotating shaft 268. The rotating shaft 268 is connected to an output shaft of a motor 270 by another gear, and the rotating shaft 268 is rotated by rotating the output shaft of the motor 270 by operating the motor 270.

The reel 256 is connected to a rotating shaft 274 by a one way clutch 272. The one way clutch 272 is configured such that it transmits only reverse rotation (rotation reverse to a rotating direction of the rotating shaft 268 in regular rotation) of the rotating shaft 274, and does not transmit regular rotation of the rotating shaft 274 to the reeling reel 256, further, regular and reverse rotations of the reeling reel 256 are not transmitted to the rotating shaft 274. The rotating shaft 274 is connected to the output shaft of the motor 270 by another gear, and the rotating shaft 274 is rotated by rotating the output shaft of the motor 270 by operating the motor 270.

Further, a buckle moving apparatus 282 as a buckle moving portion is provided on a side opposed to the buckle moving apparatus 222 via the seat 12. The buckle moving apparatus 282 differs from the buckle moving apparatus 222 only in that the housing 224 corresponds to the second lap belt 80 according to the first embodiment and in that the first buckle 90 is integrally fixed to the bottom wall (front end) of the fourth arm 246 and is otherwise configured basically the same as the buckle moving apparatus 222, and therefore, a detailed explanation thereof will be omitted here.

The motor 270 of the buckle moving apparatus 222 and the motor 270 of the buckle moving apparatus 282 are cooperatively moved. For example, when it is detected that the occupant 150 is seated on the seat cushion 16 by a seating sensor (not illustrated) forming part of a load detecting portion provided at the seat cushion 16 of the seat 12, the two motors 270 are driven to rotate regularly, and when a buckle switch (not illustrated) provided at the buckle body 92 of the first buckle 90 detects that the inserting piece 58 of the first tongue 50 is inserted inside of the buckle body 92 and the inserting piece 58 of the first tongue 50 is held by the buckle body 92, the two motors 270 are driven to rotate reversely.

Further, although the above embodiment is configured such that the motors 270 are provided respectively at the buckle moving apparatus 222 and the buckle moving apparatus 282, a configuration in which the buckle moving apparatus 222 and the buckle moving apparatus 282 are operated by the single motor 270 is also possible.

Operation, Effect of Second Embodiment

Next, an operation and an effect of the embodiment will be explained.

According to the seat belt apparatus 220 including the buckle moving apparatus 222, 282, when the occupant 150 is seated on the seat 12, and the seating sensor provided at the seat cushion 16 detects a load of the occupant 150, a control portion of ECU or the like drives to rotate regularly the both motors 270 of the buckle moving apparatus 222, 282. When the output shafts of the motors 270 are regularly rotated by driving to rotate the two motors 270 regularly, regular rotations of the output shafts of the motors 270 are transmitted to the rotating shaft 268 and the rotating shaft 274 via speed reducing mechanisms constituted by gear trains, not illustrated, and regularly rotate both of the rotating shaft 268 and the rotating shaft 274. The one way clutch 272 does not transmit regular rotation of the rotating shaft 274 to the reeling reel 256, and therefore, even when the one way clutch 272 is rotated regularly, the reeling reel 256 is not rotated in either of regular and reverse directions.

On the other hand, when the rotating shaft 268 is regularly rotated, the one way clutch 266 transmits regular rotation of the rotating shaft 268 to the feed gear 264 to regularly rotate the feed gear 264. When the feed gear 264 is rotated regularly, the extrusion belt 258 brought in mesh with the feed gear 264 is pulled out from the reeling reel 256 to invade an inner side of the first arm 232. The extrusion belt 258 invading the inner side of the first arm 232 presses the bottom wall of the front end of the fourth arm 246. Thereby, the fourth arm 246 is slid in a direction of drawing out from the opening of the front end of the third arm 240 until the outer flange 248 is interfered with the inner flange 250 from a state shown in FIG. 15 and FIG. 17.

Further, when the extrusion belt 258 pulled out from the reeling reel 256 invades the inner side of the first arm 232 further in a state of interfering the outer flange 248 with the inner flange 250, the fourth arm 246 pressed by the extrusion belt 258 pulls the third arm 240 via the outer flange 248 and the inner flange 250. Thereby, the third arm 240 is pulled out from the opening of the front end of the second arm 234 until the outer flange 242 is interfered with the inner flange 244.

In this way, as shown in FIG. 18, when the third arm 240 and the second arm 234 are pulled out until the outer flange 236 is interfered with the inner flange 238, as shown in FIG. 16, the second buckle 120 fixed to the bottom wall of the front end of the fourth arm 246 constituting the buckle moving apparatus 222 and the first buckle 90 fixed to the bottom wall of the front end of the fourth arm 246 constituting the buckle moving apparatus 282 are opposed to each other substantially along the width direction of the seat 12 at the front side of the waist portion of the occupant 150. The tongue main body 52 of the first tongue 50 is inserted to the inserting hole 94 of the buckle body 92 constituting the first buckle 90 and the tongue main body 52 of the second tongue 84 is inserted to the inserting hole 94 of the buckle body 92 constituting the second buckle 120.

Successively, when the buckle switch detects that the first tongue 50 is held by the first buckle 90 and the second tongue 84 is held by the second buckle 120 in this way, the control portion of ECU or the like drives to rotate reversely the both motors 270 of the buckle moving apparatus 222, 282. Reverse rotations of the output shafts of the motors 270 by driving to rotate reversely the two motors 270 are conducted to the rotating shaft 268 and the rotating shaft 274 to rotate reversely both of the rotating shaft 268 and the rotating shaft 274. However, the one way clutch 266 does not conduct reverse rotation of the rotating shaft 268 to the feed gear 264, and therefore, even when the rotating shaft 268 is rotated reversely, the feed gear 264 is not rotated in either of regular and reverse rotations.

In contrast thereto, reverse rotation of the rotating shaft 274 is conducted to the reeling reel 256 via the one way clutch 272 to reversely rotate the reeling reel 256. By reversely rotating the reeling reel 256, the extrusion belt 258 is wound around by the reeling reel 256 from the base end side in the longitudinal direction. By reeling the extrusion belt 258, the front end of the extrusion belt 258 pulls the bottom wall of the front end of the fourth arm 246. Thereby, the second arm 234 through the fourth arm 246 are contained in the first arm 232 in contrast to when the second arm 234 through the fourth arm 246 are pulled out and the first buckle 90 and the second buckle 120 return to original positions in the side direction of the seat 12.

By returning the first buckle 90 and the second buckle 120 to the original positions in the side direction of the seat 12, similar to the first embodiment, the first lap belt 42, the second lap belt 80, the first shoulder belt 30, and the second shoulder belt 76 extends around the body of the occupant 150, and the body of the occupant 150 is constrained by the first lap belt 42, the second lap belt 40, the first shoulder belt 30, and the second shoulder belt 76.

In this way, according to the seat belt apparatus 220, in mounting the first lap belt 42, the second lap belt 80, the first shoulder belt 30, and the second shoulder belt 76 by the occupant 150, the first buckle 90 and the second buckle 120 may not be pulled to the front side from the side direction of the seat 12, and therefore, mounting of the first lap belt 42, the second lap belt 80, the first shoulder belt 30, and the second shoulder belt 76 is facilitated.

Further, according to the embodiment, as described above by the drive force of the motor 270, the tongue main body 52 of the second tongue 84 is inserted to the inserting hole 94 of the buckle body 92 constituting the second buckle 120 and the tongue main body 52 of the first tongue 50 is inserted to the inserting hole 94 of the buckle body 92 constituting the first buckle 90. However, a configuration is possible in which the motors 270 are stopped immediately before bringing the two tongue main bodies 52 of the first tongue 50 and the second tongue 84 to the inserting holes 94 of the two buckle bodies 92 of the second buckle 120 and the first buckle 90, and the two tongue main bodies 52 of the first tongue 50 and the second tongue 84 are inserted to the inserting holes 94 of the two buckle bodies 92 of the second buckle 120 and the first buckle 90 manually from the state.

When constituted in this way, although an operability in mounting the first lap belt 42, the second lap belt 80, the first shoulder belt 30, and the second shoulder belt 76 is slightly inferior, there is achieved an advantage that dimension accuracies and positional accuracies of respective members constituting the buckle moving apparatus 222 and the buckle moving apparatus 282 for bringing the two tongue main bodies 52 of the first tongue 50 and the second tongue 84 to the inserting holes 94 of the two buckle bodies 92 of the second buckle 120 and the first buckle 90, further, the control of driving the motors 270 may not be set strictly.

Constitution of Third Embodiment

Next, a further modified example of the first embodiment will be explained as a third embodiment of the invention. Further, in explaining the embodiment, portions basically the same as those of the first embodiment are attached with the same notations and a detailed explanation thereof will be omitted.

Figure 19:
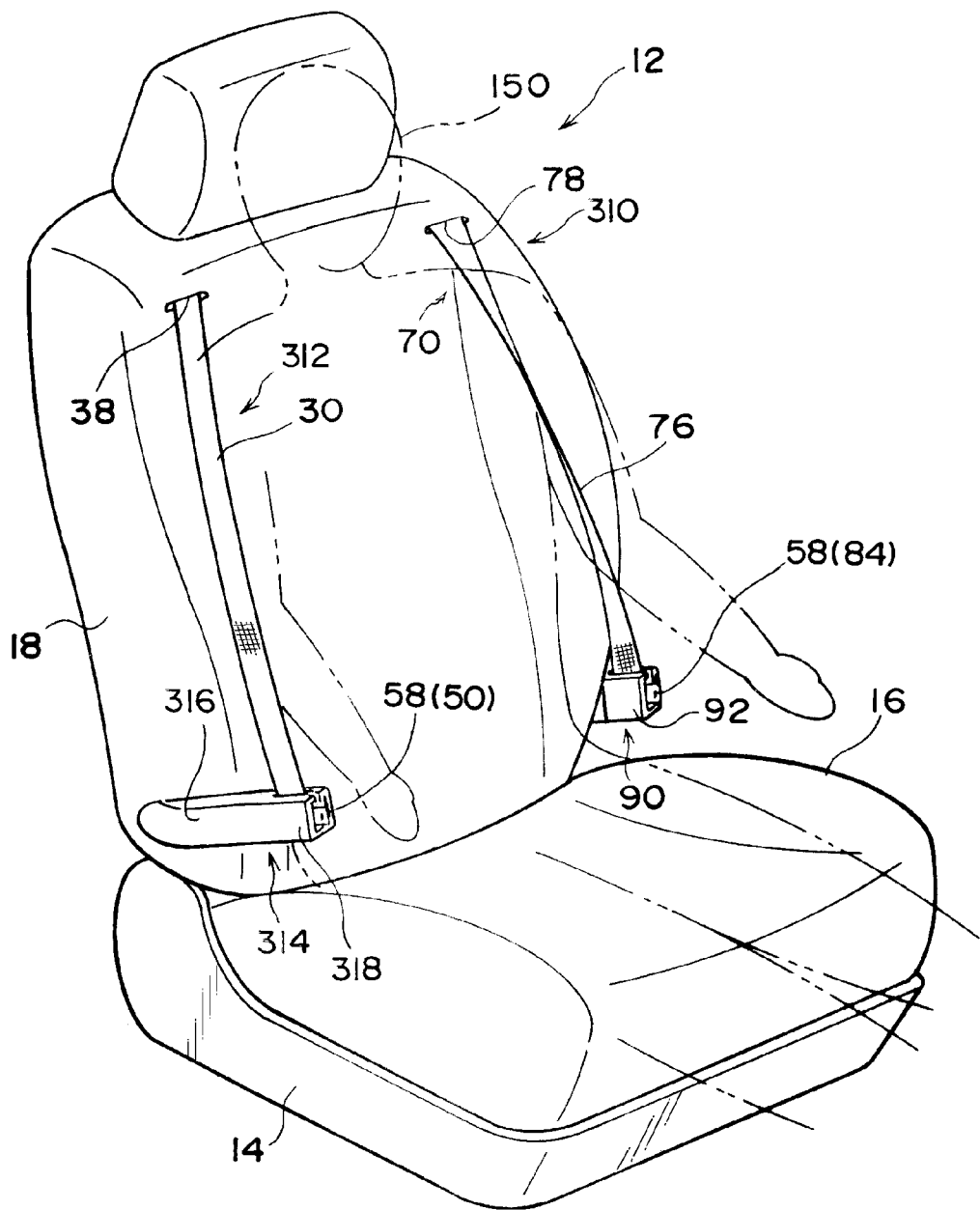
FIG. 19 is a perspective view of a seat mounted with a seat belt apparatus according to a third embodiment of the invention.

FIG. 19 shows a perspective view of the seat 12 for the vehicle mounted with a seat belt apparatus 310 according to the third embodiment of the invention. As shown by the drawing, the seat belt apparatus 310 does not include the first apparatus main body 19 but includes a first apparatus main body 312 in place thereof. The first apparatus main body 312 does not include the arm 44 and the second buckle 120 but includes a second buckle 314 in place thereof. The second buckle 314 includes an arm portion 316. The arm portion 316 is attached to the right side face of the seat back 18 at a portion in correspondence with the arm 44 according to the first embodiment in the first apparatus main body 312. Further, also the arm portion 316 is constituted to be hollow similar to the arm 44 and the first lap belt 42 passes an inner side thereof.

A front end portion of the arm portion 316 is formed with a buckle body portion 318 integrally with the arm portion 316. The buckle body portion 318 is a portion in correspondence with the buckle body 92 of the second buckle 120 according to the first embodiment in the first apparatus main body 312 and the buckle body portion 318 is constructed by a constitution basically the same as that of the buckle body 92. However, as described above, the buckle body portion 318 is integral with the arm portion 316, and therefore, the buckle body portion 318 cannot be moved to be brought into contact with and separate from the arm portion 316.

Further, other side in a thickness direction of the buckle body 318 is formed with the first tongue containing portion 140 as the first tongue holding portion similar to the buckle body 92 of the second buckle 120 according to the first embodiment.

Operation, Effect of Third Embodiment

Next, an operation and effect of the embodiment will be explained.

The seat belt apparatus 310 is integrally formed with the buckle body portion 318 and the first tongue containing portion 140 at the arm portion 316 as described above. Therefore, different from the seat belt apparatus 10 according to the first embodiment, the buckle body portion 318 and the first tongue containing portion 140 cannot be pulled to be moved to the front side of the waist portion of the occupant 150.

Figure 20:
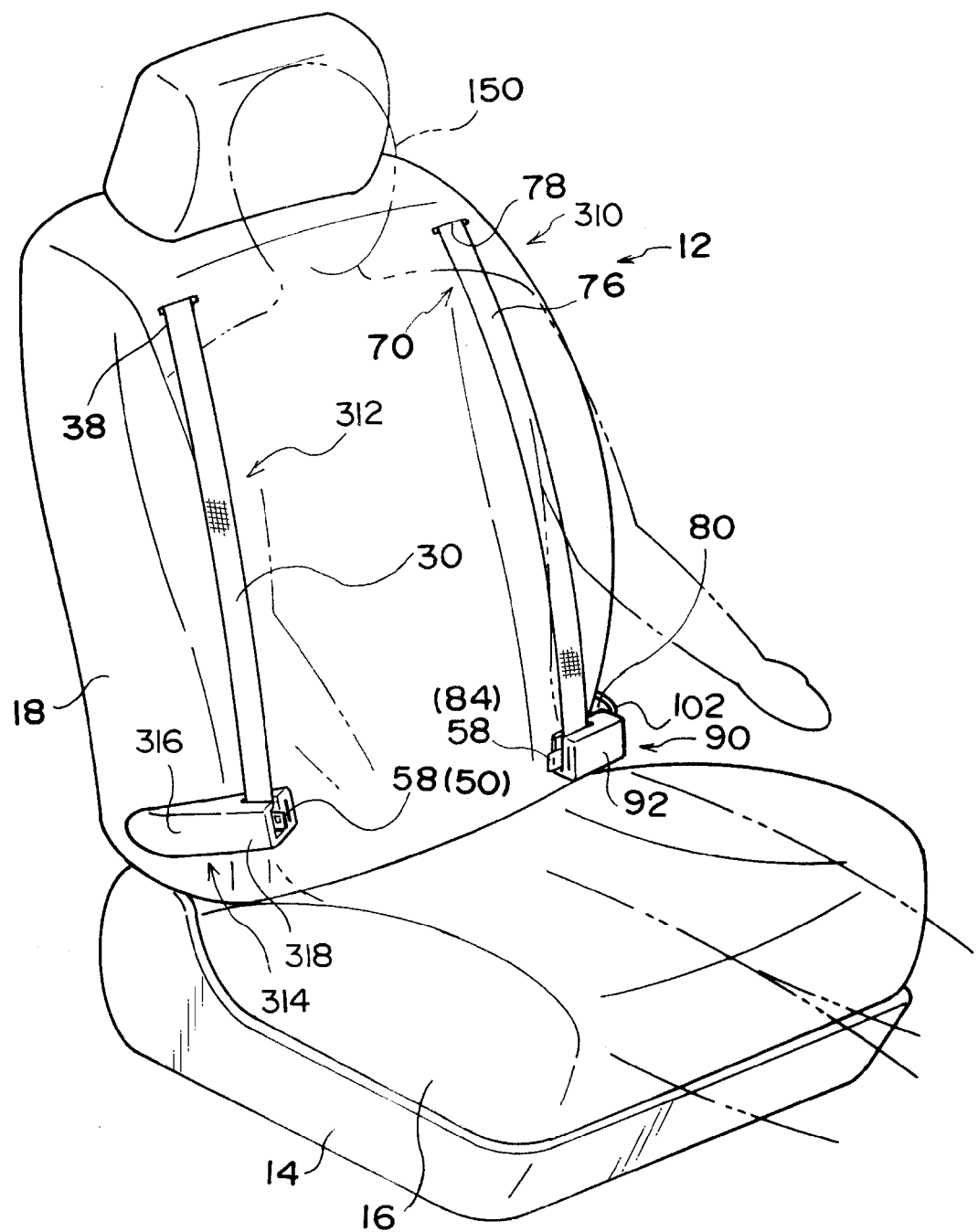
FIG. 20 is a perspective view in correspondence with FIG. 1 showing a state of pulling to move two buckles.
Figure 21:
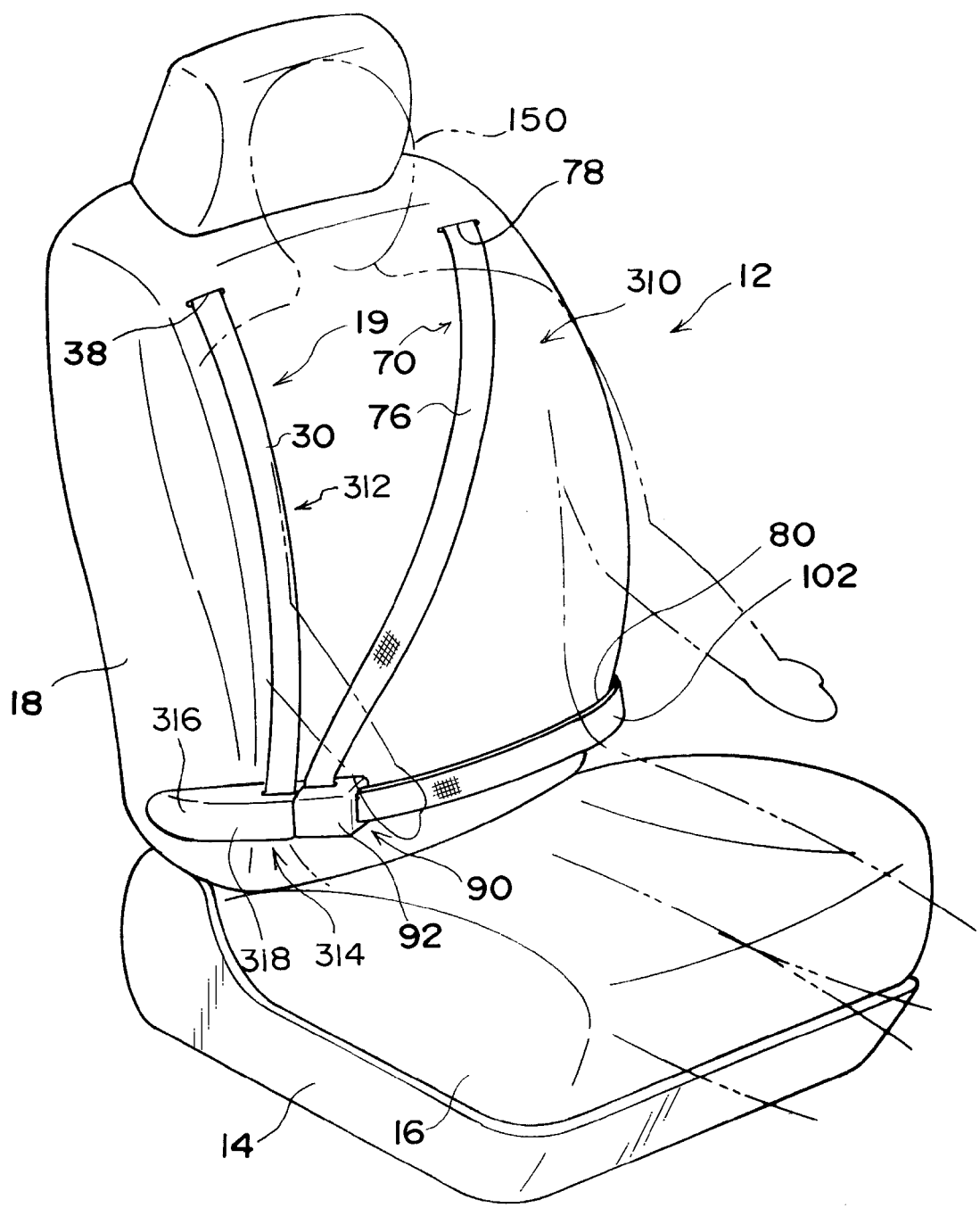
FIG. 21 is a perspective view in correspondence with FIG. 1 showing a state of having mounted two tongues to two buckles.

Therefore, as shown in FIG. 20, according to the seat belt apparatus 310, the first buckle 90 is pulled from the first initial position. Further, as shown in FIG. 21, the first buckle 90 is passed on the front side of the waist portion of the occupant 150 and the first buckle 90 is moved, until the inserting hole 94 of the first buckle 90 and the inserting piece 58 of the first tongue 50 are opposed to each other and the inserting piece 58 of the second tongue 84 and the inserting hole 94 of the buckle body portion 318 constituting the second buckle 314 are opposed to each other.

In this state, by inserting the inserting piece 58 of the first tongue 50 to the inserting hole 94 of the first buckle 90 and inserting the inserting piece 58 of the second tongue 84 to the inserting hole 94 of the buckle body portion 318 constituting the second buckle 314, the first tongue 50 is mounted to the first buckle 90, and the second tongue 84 is mounted to the second buckle 314. Thus, a state is obtained in which the second shoulder belt 76 extends around the right waist portion from the front side of the left shoulder portion via of the front side of the left chest portion, and the second lap belt 80 extends around the right waist portion from the left waist portion.

In this state, when the first buckle 90 is released from being pulled, similar to the first embodiment, the spiral spring of the first connecting belt reeling apparatus 104 rotates the spool 28 of the first connecting belt reeling apparatus 104 in the reeling direction to reel and contain the first connecting belt 102.

Figure 22:
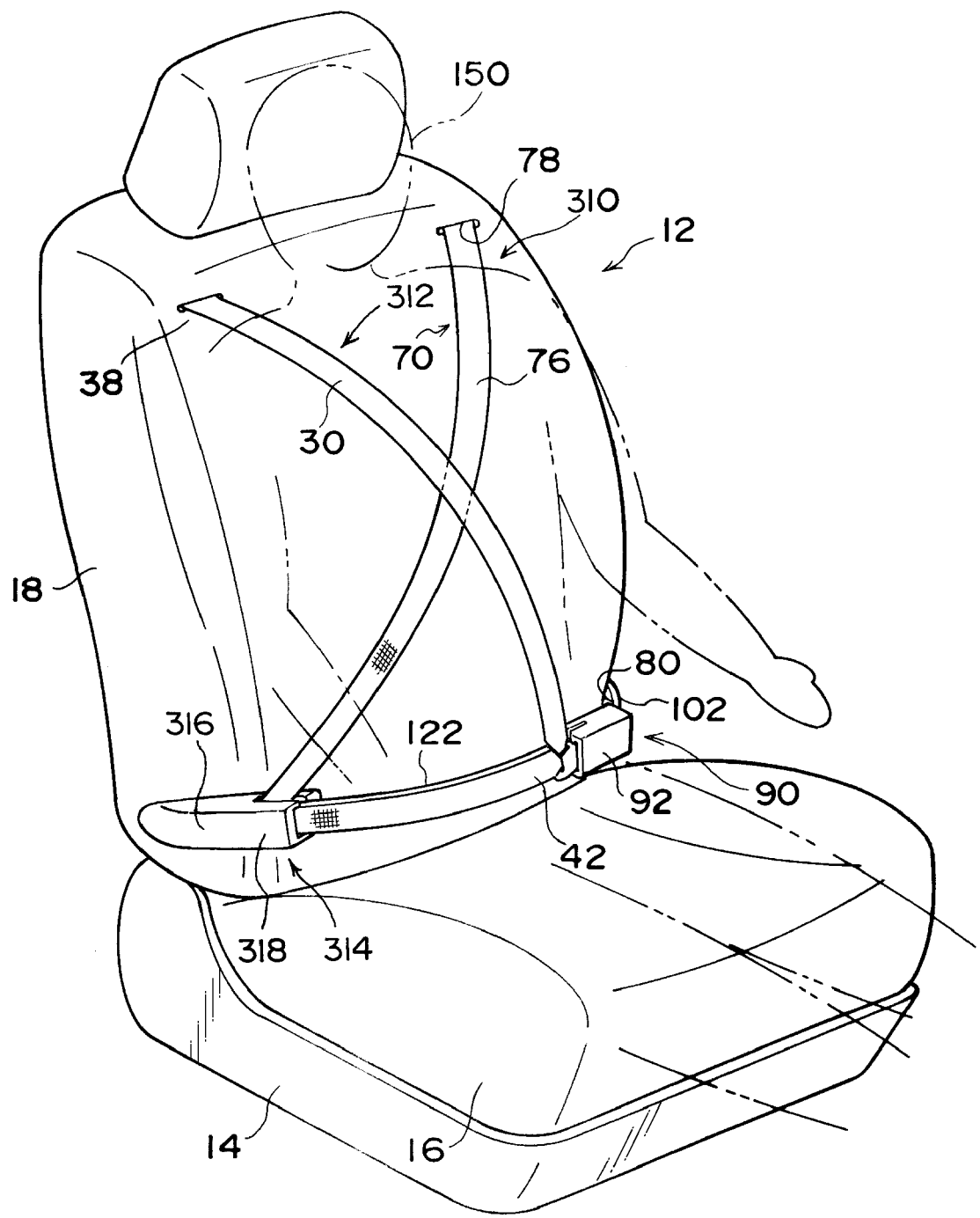
FIG. 22 is a perspective view in correspondence with FIG. 1 showing a state of returning two buckles to two initial positions along with two tongues.
Figure 23:
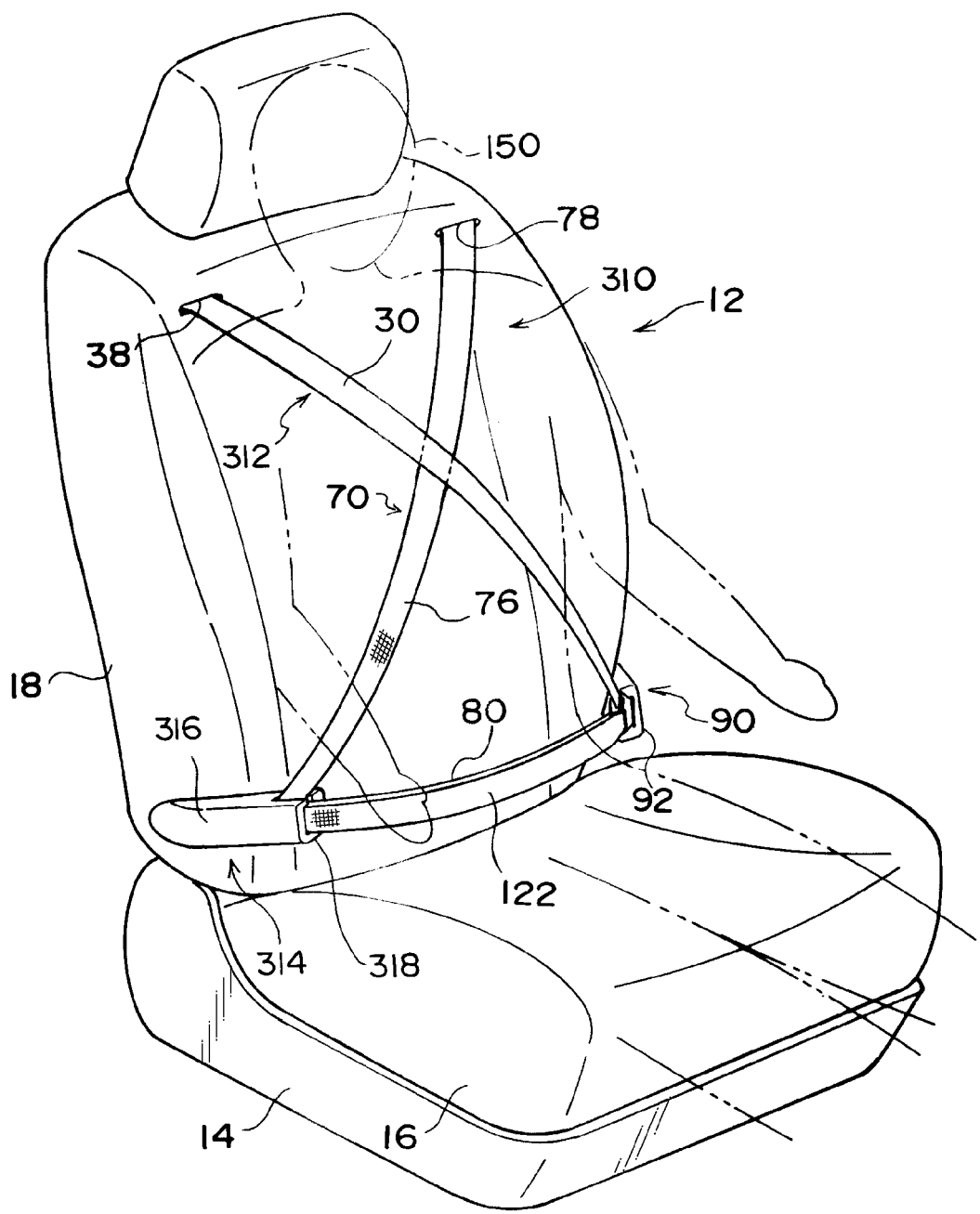
FIG. 23 is a perspective view in correspondence with FIG. 1 showing a state of having returned two buckles to two initial positions.

Thereby, as shown in FIG. 22, the first buckle 90 is moved to the first initial position. By moving the first buckle 90 to the first initial position, the first tongue 50 engaged with the latch of the first buckle 90 is moved along with the first buckle 90, and the first tongue 50 is pulled out from the containing hole 132 of the first tongue containing portion 140. As shown in FIG. 23, when the first buckle 90 returns to the first initial position from the state, the first shoulder belt 30 held by the tongue main body 52 of the first tongue 50 extends around the left waist portion from the front side of the right shoulder portion of the occupant 150 via the front side of the right chest portion and the first lap belt 42 extends around the left waist portion from the right waist portion.

In this way, also in the seat belt apparatus 310 according to the embodiment, finally, similar to the seat belt apparatus 10 according to the first embodiment, the first shoulder belt 30, the first lap belt 42, the second shoulder belt 76, and the second lap belt 80 extend around in the cross state (X-like state) on the front side of the occupant 150, and therefore, the body of the occupant 150 can be constrained more tightly than the three points type seat belt apparatus of the related art.

Further, similar to the first embodiment, when the inserting piece 58 of the first tongue 50 is inserted to the inserting hole 94 of the first buckle 90, the inserting piece 58 of the second tongue 84 is inserted to the inserting hole 94 of the buckle body portion 318 constituting the second buckle 314, and therefore, insertion of the inserting piece 58 of the first tongue 50 to the inserting hole 94 of the first buckle 90 and insertion of the inserting piece 58 of the second tongue 84 to the inserting hole 94 of the buckle body portion 318 (second buckle 314) are basically finished by one operation. Therefore, the mounting operation is extremely simplified.

Figure 24:
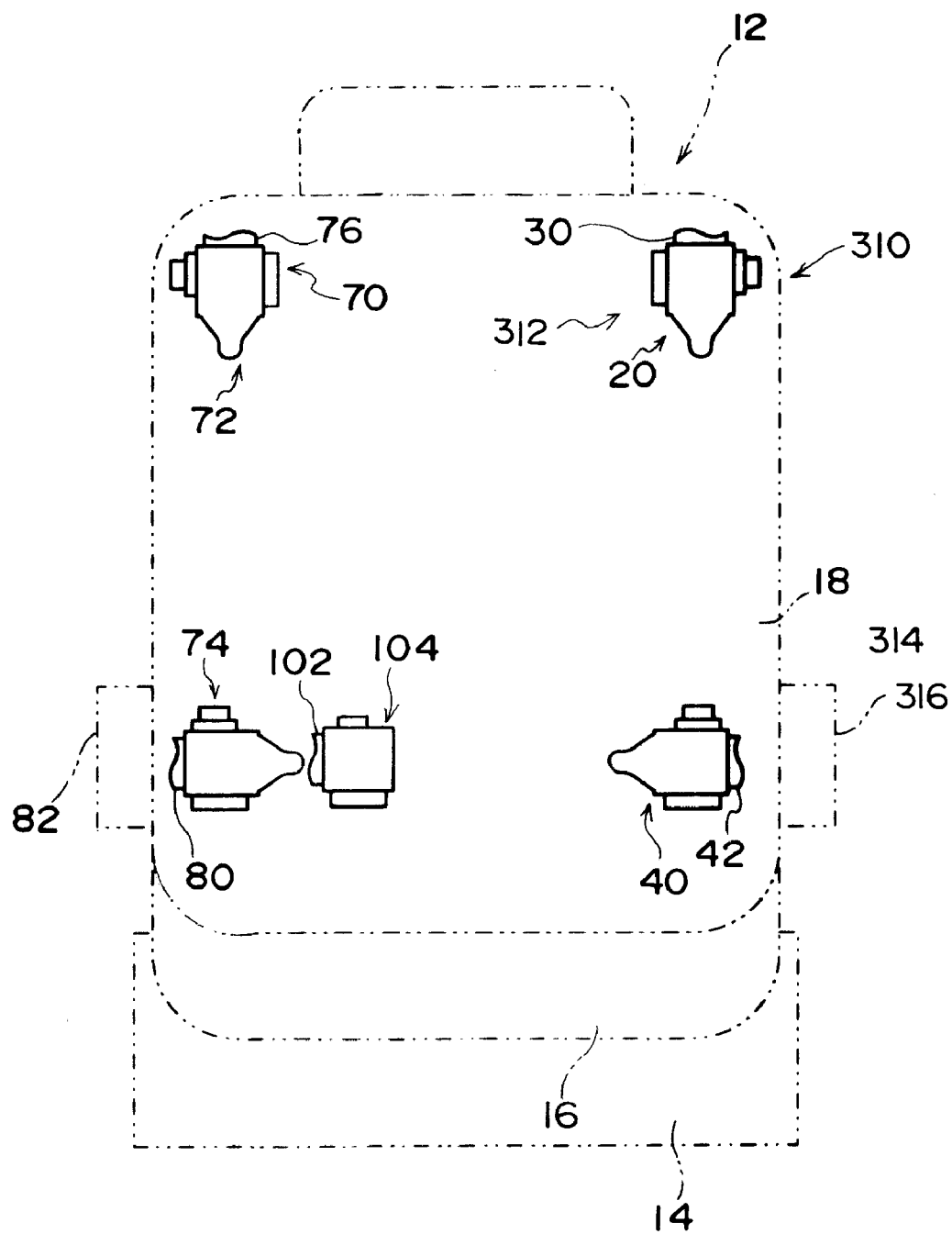
FIG. 24 is a rear view of a seat showing an essential portion of a constitution of a seat belt apparatus at inside of a seat back.

Further, as described above, the seat belt apparatus 310 according to the embodiment is constructed by a constitution of integrally forming the buckle body portion 318 and the first tongue containing portion 140 with the arm portion 316, and the buckle body portion 318 and the first tongue containing portion 140 are not pulled to move to the front side of the waist portion of the occupant 150. Therefore, the second connecting belt 122 according to the first embodiment is dispensed with. As shown in FIG. 24, the seat belt apparatus 310 according to the embodiment may not include the second connecting belt reeling apparatus 124, which is different from the seat belt apparatus 10 according to the first embodiment. Thereby, the cost can be made to be inexpensive and light-weighted formation of a total of the apparatus, and therefore, the seat 12 mounted with the seat belt apparatus 310 can be achieved.

Further, the embodiment is basically constructed by a constitution of making only the buckle on the left side of the seat 12 (that is, the first buckle 90) movable by substituting the second buckle 314 for the arm 44 and the second buckle 120 constituting the seat belt apparatus 10 according to the first embodiment. However, a configuration is possible in which the arm 44 and the second buckle 120 are provided as they are, is substituted a constitution in correspondence with the second buckle 314 for the arm 44 and the first buckle 90 on the left side of the seat 12 and only the buckle on the right side of the seat 12 (that is, second buckle 120) is made to be movable. Even in such a constitution, an operation similar to the operation of the above-described embodiment is achieved, and an effect similar to the effect of the embodiment can be achieved.

Further, although the embodiment is basically constructed by a constitution of replacing the arm 44 and the second buckle 120 constituting the seat belt apparatus 10 according to the first embodiment by the second buckle 314, a configuration is possible in which either one of the buckle moving apparatus 222 and the buckle moving apparatus 282 constituting the seat belt apparatus 220 according to the second embodiment and the first buckle 90 or the second buckle 120 provided to the either one are replaced by the second buckle 314. In this way, by replacing the either one of the buckle moving apparatus 222 and the buckle moving apparatus 282 constituted by the motor 270 or the like by the second buckle 314 having a constitution simpler than those of the buckle moving apparatus 222, 282, the cost can be made to be inexpensive and light-weighted formation of the seat 12 can be achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A seat belt apparatus comprising:
a first shoulder belt that restrains an area from a right shoulder portion to a right chest portion of an occupant seated on a seat of a vehicle;
a first lap belt, one end of which is fixed at a right rear portion of a seat cushion of the seat or in a vicinity thereof;
a first tongue connected to both of the first shoulder belt and the first lap belt;
a second shoulder belt that restrains an area from a left shoulder portion to a left chest portion of the occupant seated on the seat;
a second lap belt that restrains a waist portion of the occupant, one end thereof being fixed at a left rear portion of the seat cushion or in a vicinity thereof;
a second tongue connected to both of the second shoulder belt and the second lap belt;
a first buckle provided at the left rear portion of the seat cushion or in a vicinity thereof, to which the first tongue may be mounted such that the first shoulder belt extends from the right shoulder portion of the occupant to the right chest portion of the occupant, and the first lap belt extends around the waist portion of the occupant;
a second buckle provided at the right rear portion of the seat cushion or in a vicinity thereof, to which the second tongue may be mounted such that the second shoulder belt extends from the left shoulder portion of the occupant to the left chest portion of the occupant, and the second lap belt extends around the waist portion of the occupant;
a first tongue holding portion provided at the second buckle, which, when the second tongue is mounted to the second buckle, holds the first tongue at a position where the first tongue may be mounted to the first buckle, and, when the first tongue is mounted to the first buckle, may release the first tongue by separating the second buckle from the first buckle;
a second tongue holding portion provided at the first buckle, which, when the first tongue is mounted to the first buckle, holds the second tongue at a position where the second tongue may be mounted to the second buckle, and, when the second tongue is mounted to the second buckle, may release the second tongue by separating the first buckle from the second buckle; and
an urging portion that moves each of said first and second buckles back to an initial position after the first and second tongues are mounted to the first and second buckles,
wherein at least one buckle of the first buckle or the second buckle is movable to a tongue mounting position where the first tongue held by the first tongue holding portion may be mounted to the first buckle, and the second tongue held by the second tongue holding portion may be mounted to the second buckle.

2. The seat belt apparatus according to claim 1, wherein both of the first buckle and the second buckle are movable to the tongue mounting position.

3. The seat belt apparatus according to claim 1, wherein only one of the first buckle and the second buckle is movable to the tongue mounting position.

4. The seat belt apparatus according to claim 1, further comprising a hollow first arm which is attached to a right side face of the seat and which extends outwards therefrom, and into which the first lap belt is inserted, and a hollow second arm which is attached to a left side face of the seat and which extends outwards therefrom, and into which the second lap belt is inserted.

5. The seat belt apparatus according to claim 4, wherein the first arm and the second buckle, as well as the second arm and the first buckle are connected in an insertion direction by respective expandable and contractible cylinder members.

6. The seat belt apparatus according to claim 4, wherein one of the first arm and the second buckle, or the second arm and the first buckle, are integrally formed.

7. The seat belt apparatus according to claim 1, further comprising a motor that exerts a drive force that moves at least one of the first buckle or the second buckle, an extrusion belt comprising a base end side in a longitudinal direction which is wound around a reel, the extrusion belt being connected to at least one of the first buckle or the second buckle, and a gear portion that transmits the drive force of the motor to the extrusion belt.

8. The seat belt apparatus according to claim 1, wherein said first and second shoulder belts are crisscrossed after said urging portion moves said first and second buckles back to said initial position.

* * * * *